(12) United States Patent
Xu et al.

(10) Patent No.: US 10,959,129 B2
(45) Date of Patent: Mar. 23, 2021

(54) DATA TRANSMISSION METHOD, APPARATUS, AND SYSTEM, AND DEVICE

(71) Applicant: Huawei Technologies Co., Ltd., Shenzhen (CN)

(72) Inventors: Bin Xu, Beijing (CN); Zhenzhen Cao, Beijing (CN); Bingzhao Li, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/674,843

(22) Filed: Nov. 5, 2019

(65) Prior Publication Data

US 2020/0077300 A1 Mar. 5, 2020

Related U.S. Application Data

(63) Continuation of application No. PCT/CN2018/085530, filed on May 4, 2018.

(30) Foreign Application Priority Data

May 5, 2017 (CN) .......................... 201710314173.4

(51) Int. Cl.
 *H04W 28/06* (2009.01)
(52) U.S. Cl.
 CPC ................................. *H04W 28/065* (2013.01)
(58) Field of Classification Search
 CPC .................................................. H04W 28/065
 USPC ........................................................ 370/310
 See application file for complete search history.

(56) References Cited

U.S. PATENT DOCUMENTS

| 2007/0060139 | A1 | 3/2007 | Kim et al. | |
| 2017/0310421 | A1* | 10/2017 | Froberg Olsson | .... H04L 1/1874 |
| 2018/0302821 | A1* | 10/2018 | Gustafsson | ........... H04W 76/28 |
| 2018/0317130 | A1* | 11/2018 | Jin | ....................... H04W 28/065 |
| 2020/0059823 | A1* | 2/2020 | Lee | ....................... H04W 80/02 |
| 2020/0205224 | A1* | 6/2020 | Lee | ..................... H04W 28/065 |

FOREIGN PATENT DOCUMENTS

| CN | 101171806 A | 4/2008 |
| CN | 103561425 A | 2/2014 |
| WO | 2016080877 A1 | 5/2016 |

OTHER PUBLICATIONS

3GPP TS 36.322 V14.0.0 (Mar. 2017) (Year: 2017).*

(Continued)

*Primary Examiner* — Hassan A Phillips
*Assistant Examiner* — Mohammed S Chowdhury
(74) *Attorney, Agent, or Firm* — Leydig, Voit & Mayer, Ltd.

(57) ABSTRACT

A data transmission method includes: receiving, by a receive end, a Radio Link Control protocol data unit (RLC PDU); determining, by the receive end, whether the RLC PDU includes a complete service data unit (SDU) or an SDU segment, where the RLC PDU is transmitted in unacknowledged mode (UM); and transmitting, by the receive end to a Packet Data Convergence Protocol (PDCP) layer based on a result of the determining, the complete SDU or a complete SDU assembled by using the SDU segment. The data transmission method implements data transmission in UM at an RLC layer in 5G.

27 Claims, 7 Drawing Sheets

(56) References Cited

OTHER PUBLICATIONS

R2-1702608; 3GPP TSG-RAN2 Meeting #97bis; Spokane, USA, Apr. 3-7, 2017 (Year: 2017).*
"Assembly Timer for RLC Segments," 3GPP TSG-RAN2 Meeting #97bis, Spokane, USA, R2-1702608, pp. 1-3, 3rd Generation Partnership Project, Valbonne, France (Apr. 3-7, 2017).
"NR RLC PDU format," 3GPP TSG-RAN WG2 Meeting #97bis, Spokane, USA, R2-1703125, pp. 1-4, 3rd Generation Partnership Project, Valbonne, France (Apr. 3-7, 2017).
"RLC PDU Format," 3GPP TSG-RAN2 Meeting #97bis, Spokane, USA, R2-1702609, pp. 1-4, 3rd Generation Partnership Project, Valbonne, France (Apr. 3-7, 2017).
"3rd Generation Partnership Project; Technical Specification Group Radio Access Network; NR Access; Radio Link Control (RLC) protocol specification (Release 15)," 3GPP TS 38.322 V0.0.1, pp. 1-14, 3rd Generation Partnership Project, Valbonne, France (Apr. 2017).
"Overhead reduction for RLC UM transmission," 3GPP TSG-RAN WG2 Meeting #98, Hangzhou, China, R2-1705208, pp. 1-2, 3rd Generation Partnership Project, Valbonne, France (May 15-19, 2017).
"Report of email discussion [99#35][NR UP] Reassembly for RLC UM," 3GPP TSG-RAN WG2 #99bis, Prague, Czech Republic, R2-1711542, pp. 1-29, 3rd Generation Partnership Project, Valbonne, France (Oct. 9-13, 2017).
"SN for RLC UM," 3GPP TSG-RAN WG2, Meeting #97bis, Spokane, US,R2-1704274, XP051263560, pp. 1-2, 3rd Generation Partnership Project, Valbonne, France (Apr. 3-7, 2017).
CN/201910794393, Search Report, dated Apr. 16, 2020.

* cited by examiner

| Segment 1 | Segment 2 | Segment 3 | Segment 4 | Segment 5 | Segment 6 | Segment 7 | |

FIG. 4

| Segment 3 | Segment 5 | Segment 6 | Segment 7 | | | | |

FIG. 5

| Segment a | Segment b | Segment c | Segment d | Segment e | Segment f | Segment g | Segment h |

FIG. 6A

| Segment b | Segment e | Segment g | Segment h | | | | |

FIG. 6B

| Segment b | Segment e | Segment g | Segment h | Segment i | Segment j | Segment k | Segment l |

FIG. 7A

| Segment e | Segment g | Segment h | Segment i | Segment k | | | |

FIG. 7B

ND SYSTEM, AND DEVICE

DATA TRANSMISSION METHOD, APPARATUS, AND SYSTEM, AND DEVICE

CROSS-REFERENCE TO RELATED APPLICATIONS

This application is a continuation of International Application No. PCT/CN2018/085530, filed on May 4, 2018, which claims priority to Chinese Patent Application No. 201710314173.4, filed on May 5, 2017. The disclosures of the aforementioned applications are hereby incorporated by reference in their entireties.

TECHNICAL FIELD

This application relates to communications technologies, and in particular, to a data transmission method, apparatus, and system, and a device.

BACKGROUND

At a Radio Link Control (RLC) layer, there are three operating modes: a transparent mode (TM), an unacknowledged mode (UM), and an acknowledged mode (AM).

In the prior art, segmentation, concatenation, reordering, and duplicate detection are mainly implemented in UM at the RLC layer. In a 5th Generation mobile communications technology (5th Generation, 5G), to reduce a processing delay, functions of reordering and duplicate detection are no longer performed in UM at the RLC layer, and reordering and duplicate detection are performed at a Packet Data Convergence Protocol (PDCP) layer.

Therefore, how to perform data transmission in UM at the RLC layer in 5G becomes a problem that needs to be resolved urgently.

SUMMARY

Embodiments of this application provide a data transmission method, apparatus, and system, and a device, to resolve the foregoing prior-art problem that needs to be resolved urgently, that is, how to perform data transmission in UM at an RLC layer.

According to a first aspect, this application provides a data transmission method, including: receiving, by a receive end, an RLC protocol data unit (PDU); determining, by the receive end, whether the RLC PDU includes a complete service data unit (SDU) or an SDU segment, where the RLC PDU is transmitted in UM; and transmitting, by the receive end to a Packet Data Convergence Protocol (PDCP) layer based on a result of the determining, the complete SDU or a complete SDU assembled by using the SDU segment.

According to the data transmission method provided in the first aspect, the receive end determines whether the RLC PDU includes the complete SDU or the SDU segment, and transmits, to the PDCP layer based on the result of the determining, the complete SDU or the complete SDU assembled by using the SDU segment, thereby implementing data reception in UM at an RLC layer in 5G. In addition, because the receive end directly transmits a complete SDU to the PDCP layer, a processing delay caused by waiting for reordering at the RLC layer is avoided.

In a possible implementation, the determining, by the receive end, whether the RLC PDU includes a complete SDU or an SDU segment includes: determining, by the receive end, whether the RLC PDU includes an RLC header; and when the RLC PDU does not include an RLC header, determining, by the receive end, that the RLC PDU includes a complete SDU; or when the RLC PDU includes an RLC header, determining, by the receive end, that the RLC PDU includes an SDU segment.

According to the data transmission method provided in this implementation, the receive end may determine whether the RLC PDU includes the complete SDU or the SDU segment by determining whether the RLC PDU includes an RLC header. In addition, when the RLC PDU includes the complete SDU, the RLC PDU does not need to include the RLC header, so that transmission overheads are reduced.

In a possible implementation, the determining, by the receive end, whether the RLC PDU includes an RLC header includes: determining, by the receive end based on indication information that is in a Media Access Control (MAC) header of a MAC PDU and that is used to indicate whether the RLC PDU includes the RLC header, whether the RLC PDU includes the RLC header, where the MAC PDU includes the RLC PDU.

In a possible implementation, when the RLC PDU includes a complete SDU, an RLC header of the RLC PDU does not include a sequence number (SN) of the complete SDU.

According to the data transmission method provided in this implementation, when the RLC PDU includes a complete SDU, the RLC header of the RLC PDU does not include the SN of the complete SDU, so that transmission overheads are reduced.

In a possible implementation, the transmitting, by the receive end to a PDCP layer based on a result of the determining, the complete SDU or a complete SDU assembled by using the SDU segment includes:

when the result of the determining is that the RLC includes an SDU segment, placing, by the receive end, the SDU segment into a buffer window in reception order, and determining whether the buffer window stores all SDU segments that are required for assembling the complete SDU to which the SDU segment belongs, where the buffer window stores, in reception order, M SDU segments that are latest received and that fail to be assembled into a complete SDU; and when the buffer window stores all the SDU segments that are required for assembling the complete SDU to which the SDU segment belongs, assembling, by the receive end, the SDU segments, and transmitting the assembled complete SDU to the PDCP layer, where M is an integer greater than 0 and less than or equal to a size of the buffer window; or when the result of the determining is that the RLC PDU includes a complete SDU, transmitting, by the receive end, the complete SDU included in the RLC PDU to the PDCP layer.

According to the data transmission method provided in this implementation, the complete SDU assembled by using the SDU segment may be transmitted to the PDCP layer by using the buffer window, thereby avoiding that the SDU segment is retained in a buffer for a long time to occupy the buffer.

In a possible implementation, the method further includes: deleting, by the receive end from the buffer window, the SDU segments that are used to assemble the complete SDU, and rearranging remaining SDU segments in the buffer window in reception order.

In a possible implementation, before the placing, by the receive end, the SDU segment into a buffer window in reception order, the method further includes: when a quantity of segments in the buffer window is equal to the size of the buffer window, deleting, by the receive end from the buffer window, a first received SDU segment and another SDU segment that is in a same complete SDU to which the first received SDU segment belongs, and rearranging remaining SDU segments in the buffer window in reception order.

In a possible implementation, the method further includes:

restarting, by the receive end, a timer when the first received SDU segment in the buffer window is updated; and when the timer expires, deleting, by the receive end from the buffer window, N first received SDU segments and another SDU segment that is in a same complete SDU to which each of the N SDU segments belongs, and rearranging remaining SDU segments in the buffer window in reception order, where N is an integer greater than 0 and less than or equal to the size of the buffer window.

According to the data transmission method provided in this implementation, one or more unused SDU segments that are in the buffer window and that fail to form a complete SDU in a long time can be cleared.

In a possible implementation, the transmitting, by the receive end to a PDCP layer based on a result of the determining, the complete SDU or a complete SDU assembled by using the SDU segment includes:

when the result of the determining is that the RLC includes an SDU segment, determining, by the receive end during running of a timer, whether all SDU segments that are required for assembling the complete SDU to which the SDU segment belongs are received; and when all the SDU segments that are required for assembling the complete SDU to which the SDU segment belongs are received, assembling, by the receive end, the SDU segments, transmitting the assembled complete SDU to the PDCP layer, and stopping the timer, where the timer corresponds to the complete SDU to which the SDU segment belongs; or when the result of the determining is that the RLC PDU includes a complete SDU, transmitting, by the receive end, the complete SDU included in the RLC PDU to the PDCP layer.

According to the data transmission method provided in this implementation, the complete SDU assembled by using the SDU segment may be transmitted to the PDCP layer in a manner that one complete SDU corresponds to one timer, thereby avoiding that SDU segments belonging to a same complete SDU are retained in a buffer for a long time to occupy the buffer.

In a possible implementation, the method further includes: when the timer expires, discarding, by the receive end, the SDU segment and an SDU segment that is in the same complete SDU to which the SDU segment belongs.

In a possible implementation, before the determining, by the receive end during running of the timer, whether all SDU segments that are required for assembling the complete SDU to which the SDU segment belongs are received, the method further includes: starting, by the receive end, the timer when the SDU segment is a first received SDU segment of the complete SDU to which the SDU segment belongs.

According to the data transmission method provided in this implementation, total duration of waiting for reception of all SDU segments of a complete SDU can be controlled.

In a possible implementation, before the determining, by the receive end during running of the timer, whether all SDU segments that are required for assembling the complete SDU to which the SDU segment belongs are received, the method further includes: determining, by the receive end, whether the timer is running; and restarting, by the receive end, the timer when the timer is running; or starting, by the receive end, the timer when the timer is not running.

According to the data transmission method provided in this implementation, duration of waiting for reception of a next SDU segment that is in a same complete SDU to which an SDU segment belongs can be controlled.

In a possible implementation, the transmitting, by the receive end to a PDCP layer based on a result of the determining, the complete SDU or a complete SDU assembled by using the SDU segment includes:

when the result of the determining is that the RLC PDU includes an SDU segment, determining, by the receive end during running of a timer, whether all SDU segments that are required for assembling the complete SDU to which the SDU segment belongs are received; and when all the SDU segments that are required for assembling the complete SDU to which the SDU segment belongs are received, assembling, by the receive end, the SDU segments, and transmitting the assembled complete SDU to the PDCP layer, where the timer corresponds to an SDU segment; or when the result of the determining is that the RLC PDU includes a complete SDU, transmitting, by the receive end, the complete SDU included in the RLC PDU to the PDCP layer.

According to the data transmission method provided in this implementation, the complete SDU assembled by using the SDU segment may be transmitted to the PDCP layer in a manner that all SDU segments correspond to a same timer, thereby avoiding that the SDU segment corresponding to the timer and an SDU segment that is received earlier than the SDU segment corresponding to the timer are retained in a buffer for a long time to occupy the buffer.

In a possible implementation, before the determining, by the receive end during running of the timer, whether all SDU segments that are required for assembling the complete SDU to which the SDU segment belongs are received, the method further includes: determining, by the receive end, whether the timer is running; and when the timer is not running, determining, by the receive end, that the SDU segment corresponding to the timer is the SDU segment included in the RLC PDU, and starting the timer.

In a possible implementation, the method further includes: when the timer expires, discarding, by the receive end, the SDU segment corresponding to the timer and an SDU segment that is received earlier than the SDU segment corresponding to the timer.

In a possible implementation, the method further includes: when the timer expires, determining, by the receive end, whether there is an SDU segment that waits for assembly; and when there is an SDU segment that waits for assembly, determining, by the receive end, that the timer corresponds to a latest received SDU segment of all SDU segments that wait for assembly, and starting the timer.

In a possible implementation, the method further includes: when the timer expires, discarding, by the receive end, an SDU segment that is received later than the SDU segment corresponding to the timer and that is in a same complete SDU to which the discarded SDU segment belongs.

According to the data transmission method provided in this implementation, when the timer expires, not only the SDU segment corresponding to the timer and the SDU segment that is received earlier than the SDU segment corresponding to the timer are discarded, but also the SDU segment that is received later than the SDU segment corresponding to the timer and that is in the same complete SDU to which the discarded SDU segment belongs may be discarded, so that buffer space is saved.

According to a second aspect, this application provides a data transmission method, including: determining, by a transmit end, whether a to-be-sent complete SDU needs to be segmented; when the complete SDU does not need to be segmented, including, by the transmit end, the complete SDU in an RLC PDU, where an RLC header of the RLC PDU does not include an SN of the complete SDU; and sending, by the transmit end, the RLC PDU through a MAC layer, where the RLC PDU is transmitted in UM.

According to the data transmission method provided in the second aspect, when determining that the to-be-sent complete SDU does not need to be segmented, the transmit end includes the complete SDU in the RLC PDU, and sends the RLC PDU through the MAC layer, where the RLC header of the RLC PDU does not include the SN of the complete SDU, so that data transmission in UM at an RLC layer in 5G is implemented. In addition, because the RLC header of the RLC PDU that includes the complete SDU does not include the SN of the complete SDU, transmission overheads can be reduced.

According to a third aspect, this application provides a data transmission method, including: determining, by a transmit end, whether a to-be-sent complete SDU needs to be segmented; when the complete SDU does not need to be segmented, using, by the transmit end, the complete SDU as an RLC PDU; and instructing, by the transmit end, a MAC layer to add, to a MAC header of a MAC PDU, indication information used to indicate that the RLC PDU does not include an RLC header, and sending the RLC PDU through the MAC layer, where the MAC PDU includes the RLC PDU, and the RLC PDU is transmitted in UM.

According to the data transmission method provided in the third aspect, when determining that the to-be-sent complete SDU does not need to be segmented, the transmit end uses the complete SDU as the RLC PDU, instructs the MAC layer to add, to the MAC header of the MAC PDU, the indication information used to indicate that the RLC PDU does not include the RLC header, and sends the RLC PDU through the MAC layer, so that data transmission in UM at an RLC layer in 5G is implemented. In addition, because the RLC PDU that includes the complete SDU does not include the RLC header, transmission overheads can be reduced.

According to a fourth aspect, this application provides a data transmission apparatus, including:

a receiving module, configured to receive a Radio Link Control protocol data unit (RLC PDU); and a processing module, configured to: determine whether the RLC PDU includes a complete service data unit (SDU) or an SDU segment; and transmit, to a Packet Data Convergence Protocol (PDCP) layer based on a result of the determining, the complete SDU or a complete SDU assembled by using the SDU segment, where the RLC PDU is transmitted in unacknowledged mode (UM).

In a possible implementation, that the processing module determines whether the RLC PDU includes a complete service data unit (SDU) or an SDU segment includes: determining whether the RLC PDU includes an RLC header; and when the RLC PDU does not include an RLC header, determining that the RLC PDU includes the complete SDU; or when the RLC PDU includes an RLC header, determining that the RLC PDU includes the SDU segment.

In a possible implementation, that the processing module determines whether the RLC PDU includes an RLC header includes:

determining, based on indication information that is in a MAC header of a Media Access Control (MAC) PDU and that is used to indicate whether the RLC PDU includes the RLC header, whether the RLC PDU includes the RLC header, where the MAC PDU includes the RLC PDU.

In a possible implementation, when the RLC PDU includes the complete SDU, the RLC header of the RLC PDU does not include a sequence number (SN) of the complete SDU.

In a possible implementation, that the processing module transmits, to a Packet Data Convergence Protocol (PDCP) layer based on a result of the determining, the complete SDU or a complete SDU assembled by using the SDU segment includes:

when the result of the determining is that the RLC includes an SDU segment, placing the SDU segment into a buffer window in reception order, and determining whether the buffer window stores all SDU segments that are required for assembling the complete SDU to which the SDU segment belongs; and when the buffer window stores all the SDU segments that are required for assembling the complete SDU to which the SDU segment belongs, performing assembly, and transmitting the assembled complete SDU to the PDCP layer, where the buffer window stores, in reception order, M SDU segments that are latest received and that fail to be assembled into a complete SDU, and M is an integer greater than 0 and less than or equal to a size of the buffer window; or when the result of the determining is that the RLC PDU includes a complete SDU, transmitting the complete SDU included in the RLC PDU to the PDCP layer.

In a possible implementation, the processing module is further configured to: delete, from the buffer window, the SDU segments that are used to assemble the complete SDU, and rearrange remaining SDU segments in the buffer window in reception order.

In a possible implementation, the processing module is further configured to: when a quantity of segments in the buffer window is equal to the size of the buffer window, delete, from the buffer window, a first received SDU segment and another SDU segment that is in a same complete SDU to which the first received SDU segment belongs, and rearrange remaining SDU segments in the buffer window in reception order.

In a possible implementation, the processing module is further configured to: restart a timer when the first received SDU segment in the buffer window is updated; and when the timer expires, delete, from the buffer window, N first received SDU segments and another SDU segment that is in a same complete SDU to which each of the N SDU segments belongs, and rearrange remaining SDU segments in the buffer window in reception order, where N is an integer greater than 0 and less than or equal to the size of the buffer window.

In a possible implementation, that the processing module transmits, to a Packet Data Convergence Protocol (PDCP) layer based on a result of the determining, the complete SDU or a complete SDU assembled by using the SDU segment includes:

when the result of the determining is that the RLC includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, transmitting the assembled complete SDU to the PDCP layer, and stopping the timer, where the timer corresponds to the complete SDU to which the SDU segment belongs; or when the result of the determining is that the RLC PDU includes a complete SDU, transmitting the complete SDU included in the RLC PDU to the PDCP layer.

In a possible implementation, the processing module is further configured to: when the timer expires, discard the SDU segment and an SDU segment that is in the same complete SDU to which the SDU segment belongs.

In a possible implementation, the processing module is further configured to start the timer when the SDU segment is a first received SDU segment of the complete SDU to which the SDU segment belongs.

In a possible implementation, the processing module is further configured to: determine whether the timer is running; and restart the timer when the timer is running; or start the timer when the timer is not running.

In a possible implementation, that the processing module transmits, to a Packet Data Convergence Protocol (PDCP) layer based on a result of the determining, the complete SDU or a complete SDU assembled by using the SDU segment includes:

when the result of the determining is that the RLC PDU includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, and transmitting the assembled complete SDU to the PDCP layer, where the timer corresponds to an SDU segment; or when the result of the determining is that the RLC PDU includes a complete SDU, transmitting the complete SDU included in the RLC PDU to the PDCP layer.

In a possible implementation, the processing module is further configured to: determine whether the timer is running; and when the timer is not running, determine that the SDU segment corresponding to the timer is the SDU segment included in the RLC PDU, and start the timer.

In a possible implementation, the processing module is further configured to: when the timer expires, discard the SDU segment corresponding to the timer and an SDU segment that is received earlier than the SDU segment corresponding to the timer.

In a possible implementation, the processing module is further configured to: when the timer expires, determine whether there is an SDU segment that waits for assembly; and when there is an SDU segment that waits for assembly, determine that the timer corresponds to a latest received SDU segment of all SDU segments that wait for assembly, and start the timer.

In a possible implementation, the processing module is further configured to: when the timer expires, discard an SDU segment that is received later than the SDU segment corresponding to the timer and that is in a same complete SDU to which the discarded SDU segment belongs.

For beneficial effects of the data transmission apparatus provided in the fourth aspect and possible implementations of the fourth aspect, refer to beneficial effects brought by the first aspect and possible implementations of the first aspect, and details are not described herein again.

According to a fifth aspect, this application provides a data transmission apparatus, including:

a processing module, configured to: determine whether a to-be-sent complete service data unit (SDU) needs to be segmented; and when the complete SDU does not need to be segmented, add the complete SDU to a Radio Link Control protocol data unit (RLC PDU), where an RLC header of the RLC PDU does not include an SN of the complete SDU; and a sending module, configured to send the RLC PDU through a Media Access Control (MAC) layer, where the RLC PDU is transmitted in unacknowledged mode (UM).

For beneficial effects of the data transmission apparatus provided in the fifth aspect, refer to beneficial effects brought by the second aspect, and details are not described herein again.

According to a sixth aspect, this application provides a data transmission apparatus, including:

a processing module, configured to: determine whether a to-be-sent complete SDU needs to be segmented; and when the complete service data unit (SDU) does not need to be segmented, use the complete SDU as a Radio Link Control protocol data unit (RLC PDU); and a sending module, configured to instruct a Media Access Control (MAC) layer to add, to a MAC header of a MAC PDU, indication information used to indicate that the RLC PDU does not include an RLC header, and send the RLC PDU through the MAC layer, where the MAC PDU includes the RLC PDU, and the RLC PDU is transmitted in unacknowledged mode (UM).

For beneficial effects of the data transmission apparatus provided in the sixth aspect, refer to beneficial effects brought by the third aspect, and details are not described herein again.

According to a seventh aspect, this application provides a receive end, including a receiver and a processor, where the receiver is configured to receive a Radio Link Control protocol data unit (RLC PDU); and the processor is configured to: determine whether the RLC PDU includes a complete service data unit (SDU) or an SDU segment; and transmit, to a Packet Data Convergence Protocol (PDCP) layer based on a result of the determining, the complete SDU or a complete SDU assembled by using the SDU segment, where the RLC PDU is transmitted in unacknowledged mode (UM).

In a possible implementation, that the processor determines whether the RLC PDU includes a complete SDU or an SDU segment includes: determining whether the RLC PDU includes an RLC header; and when the RLC PDU does not include an RLC header, determining that the RLC PDU includes the complete SDU; or when the RLC PDU includes an RLC header, determining that the RLC PDU includes the SDU segment.

In a possible implementation, that the processor determines whether the RLC PDU includes an RLC header includes: determining, based on indication information that is in a MAC header of a Media Access Control (MAC) PDU and that is used to indicate whether the RLC PDU includes the RLC header, whether the RLC PDU includes the RLC header, where the MAC PDU includes the RLC PDU.

In a possible implementation, when the RLC PDU includes the complete SDU, the RLC header of the RLC PDU does not include a sequence number (SN) of the complete SDU.

In a possible implementation, that the processor transmits, to a PDCP layer based on a result of the determining, the complete SDU or a complete SDU assembled by using the SDU segment includes:

when the result of the determining is that the RLC includes an SDU segment, placing the SDU segment into a buffer window in reception order, and determining whether the buffer window stores all SDU segments that are required for assembling the complete SDU to which the SDU segment belongs, where the buffer window stores, in reception order, M SDU segments that are latest received and that fail to be assembled into a complete SDU; and when the buffer window stores all the SDU segments that are required for assembling the complete SDU to which the SDU segment belongs, performing assembly, and transmitting the assembled complete SDU to the PDCP layer, where M is an integer greater than 0 and less than or equal to a size of the buffer window; or when the result of the determining is that the RLC PDU includes a complete SDU, transmitting the complete SDU included in the RLC PDU to the PDCP layer.

In a possible implementation, the processor is further configured to: delete, from the buffer window, the SDU segments that are used to assemble the complete SDU, and rearrange remaining SDU segments in the buffer window in reception order.

In a possible implementation, the processor is further configured to: when a quantity of segments in the buffer window is equal to the size of the buffer window, delete, from the buffer window, a first received SDU segment and another SDU segment that is in a same complete SDU to which the first received SDU segment belongs, and rearrange remaining SDU segments in the buffer window in reception order.

In a possible implementation, the processor is further configured to: restart a timer when the first received SDU segment in the buffer window is updated; and when the timer expires, delete, from the buffer window, N first received SDU segments and another SDU segment that is in a same complete SDU to which each of the N SDU segments belongs, and rearrange remaining SDU segments in the buffer window in reception order, where N is an integer greater than 0 and less than or equal to the size of the buffer window.

In a possible implementation, that the processor transmits, to a PDCP layer based on a result of the determining, the complete SDU or a complete SDU assembled by using the SDU segment includes:

when the result of the determining is that the RLC includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, transmitting the assembled complete SDU to the PDCP layer, and stopping the timer, where the timer corresponds to the complete SDU to which the SDU segment belongs; or when the result of the determining is that the RLC PDU includes a complete SDU, transmitting the complete SDU included in the RLC PDU to the PDCP layer.

In a possible implementation, the processor is further configured to: when the timer expires, discard the SDU segment and an SDU segment that is in the same complete SDU to which the SDU segment belongs.

In a possible implementation, the processor is further configured to start the timer when the SDU segment is a first received SDU segment of the complete SDU to which the SDU segment belongs.

In a possible implementation, the processor is further configured to: determine whether the timer is running; and restart the timer when the timer is running; or start the timer when the timer is not running.

In a possible implementation, that the processor transmits, to a PDCP layer based on a result of the determining, the complete SDU or a complete SDU assembled by using the SDU segment includes:

when the result of the determining is that the RLC PDU includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, and transmitting the assembled complete SDU to the PDCP layer, where the timer corresponds to an SDU segment; or when the result of the determining is that the RLC PDU includes a complete SDU, transmitting the complete SDU included in the RLC PDU to the PDCP layer.

In a possible implementation, the processor is further configured to: determine whether the timer is running; and when the timer is not running, determine that the SDU segment corresponding to the timer is the SDU segment included in the RLC PDU, and start the timer.

In a possible implementation, the processor is further configured to: when the timer expires, discard the SDU segment corresponding to the timer and an SDU segment that is received earlier than the SDU segment corresponding to the timer.

In a possible implementation, the processor is further configured to: when the timer expires, determine whether there is an SDU segment that waits for assembly; and when there is an SDU segment that waits for assembly, determine that the timer corresponds to a latest received SDU segment of all SDU segments that wait for assembly, and start the timer.

In a possible implementation, the processor is further configured to: when the timer expires, discard an SDU segment that is received later than the SDU segment corresponding to the timer and that is in a same complete SDU to which the discarded SDU segment belongs.

For beneficial effects of the data transmission apparatus provided in the seventh aspect and possible implementations of the seventh aspect, refer to beneficial effects brought by the first aspect and possible implementations of the first aspect, and details are not described herein again.

According to an eighth aspect, this application provides a transmit end, including a transmitter and a processor, where the processor is configured to: determine whether a to-be-sent complete service data unit (SDU) needs to be segmented; and when the complete SDU does not need to be segmented, add the complete SDU to a Radio Link Control protocol data unit (RLC PDU), where an RLC header of the RLC PDU does not include an SN of the complete SDU; and the transmitter is configured to send the RLC PDU through a Media Access Control (MAC) layer, where the RLC PDU is transmitted in unacknowledged mode (UM).

For beneficial effects of the data transmission apparatus provided in the eighth aspect, refer to beneficial effects brought by the second aspect, and details are not described herein again.

According to a ninth aspect, this application provides a transmit end, including a transmitter and a processor, where the processor is configured to: determine whether a to-be-sent complete SDU needs to be segmented; and when the complete service data unit (SDU) does not need to be segmented, use the complete SDU as a Radio Link Control protocol data unit (RLC PDU), and instruct a Media Access Control (MAC) layer to add, to a MAC header of a MAC PDU, indication information used to indicate that the RLC PDU does not include an RLC header, where the MAC PDU includes the RLC PDU, and the RLC PDU is transmitted in unacknowledged mode (UM); and the transmitter is configured to send the RLC PDU through the MAC layer.

For beneficial effects of the data transmission apparatus provided in the ninth aspect, refer to beneficial effects brought by the third aspect, and details are not described herein again.

According to a tenth aspect, this application provides a receive end, including at least one processing element (or chip) for performing the method in the first aspect or the implementations of the first aspect.

According to an eleventh aspect, this application provides a transmit end, including at least one processing element (or chip) for performing the method in the second aspect.

According to a twelfth aspect, this application provides a transmit end, including at least one processing element (or chip) for performing the method in the third aspect.

According to a thirteenth aspect, this application provides a readable storage medium, where the readable storage medium stores an executable instruction. When at least one processor of a receive end executes the executable instruction, the receive end performs the data transmission method provided in the first aspect or the implementations of the first aspect.

According to a fourteenth aspect, this application provides a readable storage medium, where the readable storage medium stores an executable instruction. When at least one processor of a transmit end executes the executable instruction, the transmit end performs the data transmission method provided in the second aspect.

According to a fifteenth aspect, this application provides a readable storage medium, where the readable storage medium stores an executable instruction. When at least one processor of a transmit end executes the executable instruction, the transmit end performs the data transmission method provided in the third aspect.

According to a sixteenth aspect, this application provides a program product, where the program product includes an executable instruction, and the executable instruction is stored in a readable storage medium. At least one processor of a receive end may read the executable instruction from the readable storage medium, and the at least one processor executes the executable instruction, so that the receive end implements the data transmission method provided in the first aspect or the implementations of the first aspect.

According to a seventeenth aspect, this application provides a program product, where the program product includes an executable instruction, and the executable instruction is stored in a readable storage medium. At least one processor of a transmit end may read the executable instruction from the readable storage medium, and the at least one processor executes the executable instruction, so that the transmit end implements the data transmission method provided in the second aspect.

According to an eighteenth aspect, this application provides a program product, where the program product includes an executable instruction, and the executable instruction is stored in a readable storage medium. At least one processor of a transmit end may read the executable instruction from the readable storage medium, and the at least one processor executes the executable instruction, so that the transmit end implements the data transmission method provided in the third aspect.

According to a nineteenth aspect, this application provides a data transmission system, including the data transmission apparatus in the fifth aspect or the sixth aspect and the data transmission apparatus in the fourth aspect or the implementations of the fourth aspect.

According to a twentieth aspect, this application provides a data transmission method, including:

determining, by a transmit end, a protocol data unit (PDU) of a protocol layer, where the PDU includes a format indicator field of a PDU of an upper layer of the protocol layer, and the format indicator field is used to indicate whether the PDU of the upper layer includes specific information; and sending, by the transmit end, the PDU of the protocol layer through a lower layer of the protocol layer.

In a possible implementation, the protocol layer is a Packet Data Convergence Protocol (PDCP) layer or a Radio Link Control RLC layer.

In a possible implementation, when the protocol layer is the PDCP layer, the upper layer of the protocol layer is a Service Data Adaptation Protocol (SDAP) layer.

In a possible implementation, when the protocol layer is the RLC, the upper layer of the protocol layer is the PDCP.

In a possible implementation, when the upper layer of the protocol layer is the SDAP layer, the specific information is a quality of service flow identifier (QoS flow ID).

In a possible implementation, when the upper layer of the protocol layer is the SDAP layer, the specific information is a PDU header.

In a possible implementation, when the upper layer of the protocol layer is the SDAP layer, the format indicator field may be included in a PDU header of the protocol layer.

In a possible implementation, when the upper layer of the protocol layer is the PDCP layer, the specific information is a sequence number (SN).

According to the data transmission method provided in the twentieth aspect, because the specific information is not necessarily carried in some transmission scenarios, the PDU of the protocol layer includes the format indicator field used to indicate whether the upper layer of the protocol layer includes the specific information. In addition, a length of specific indication information is usually greater than that of the format indicator field, so that transmission overheads are reduced.

According to a twenty-first aspect, this application provides a data transmission method, including:

determining, by a receive end, an RLC PDU, where the RLC PDU includes at least one format indicator field, the format indicator field is used to indicate whether a specified area corresponding to the format indicator field includes a specific indicator field, and each of the at least one format indicator field corresponds to one specified area; and sending, by the receive end, the RLC PDU through a lower layer of present protocol layer.

In a possible implementation, the specific indicator field includes a consecutively lost packet SN indicator field, and/or an SOstart field, and/or an SOend field.

According to the data transmission method provided in the twenty-first aspect, the RLC PDU includes the format indicator field, and the format indicator field indicates whether the specified area corresponding to the format indicator field includes the specific indicator field, thereby avoiding transmission overheads brought by carrying a specific indicator field when the specific indicator field does not need to be carried, and reducing transmission overheads.

According to a twenty-second aspect, this application provides a data transmission apparatus, including:

a processing module, configured to determine a protocol data unit (PDU) of a protocol layer, where the PDU includes a format indicator field of a PDU of an upper layer of the protocol layer, and the format indicator field is used to indicate whether the PDU of the upper layer includes specific information; and a sending module, configured to send the PDU of the protocol layer through a lower layer of the protocol layer.

In a possible implementation, the protocol layer is a data convergence protocol layer PDCP or a Radio Link Control RLC layer.

In a possible implementation, when the protocol layer is the PDCP, the upper layer of the protocol layer is a Service Data Adaptation Protocol (SDAP) layer.

In a possible implementation, when the protocol layer is the RLC, the upper layer of the protocol layer is a PDCP.

In a possible implementation, when the upper layer of the protocol layer is the SDAP layer, the specific information is a quality of service flow identifier (QoS flow ID).

In a possible implementation, when the upper layer of the protocol layer is the SDAP layer, the specific information is a PDU header.

In a possible implementation, when the upper layer of the protocol layer is the SDAP layer, the format indicator field may be included in a PDU header of the protocol layer.

In a possible implementation, when the upper layer of the protocol layer is the PDCP layer, the specific information is a sequence number (SN).

For beneficial effects of the data transmission apparatus provided in the twenty-second aspect, refer to beneficial effects brought by the twentieth aspect, and details are not described herein again.

According to a twenty-third aspect, this application provides a data transmission apparatus, including:

a processing module, configured to determine an RLC PDU, where the RLC PDU includes at least one format indicator field, the format indicator field is used to indicate whether a specified area corresponding to the format indicator field includes a specific indicator field, and each of the at least one format indicator field corresponds to one specified area; and a sending module, configured to send the RLC PDU through a lower layer of present protocol layer.

In a possible implementation, the specific indicator field includes a consecutively lost packet SN indicator field, and/or an SOstart field, and/or an SOend field.

For beneficial effects of the data transmission apparatus provided in the twenty-third aspect, refer to beneficial effects brought by the twenty-first aspect, and details are not described herein again.

According to a twenty-fourth aspect, this application provides a transmit end, including:

a processor, configured to determine a protocol data unit (PDU) of a protocol layer, where the PDU includes a format indicator field of a PDU of an upper layer of the protocol layer, and the format indicator field is used to indicate whether the PDU of the upper layer includes specific information; and a transmitter, configured to send the PDU of the protocol layer through a lower layer of the protocol layer.

In a possible implementation, the protocol layer is a data convergence protocol layer PDCP or a Radio Link Control RLC layer.

In a possible implementation, when the protocol layer is the PDCP, the upper layer of the protocol layer is a Service Data Adaptation Protocol (SDAP) layer.

In a possible implementation, when the protocol layer is the RLC, the upper layer of the protocol layer is a PDCP.

In a possible implementation, when the upper layer of the protocol layer is the SDAP layer, the specific information is a quality of service flow identifier (QoS flow ID).

In a possible implementation, when the upper layer of the protocol layer is the SDAP layer, the specific information is a PDU header.

In a possible implementation, when the upper layer of the protocol layer is the SDAP layer, the format indicator field may be included in a PDU header of the protocol layer.

In a possible implementation, when the upper layer of the protocol layer is the PDCP layer, the specific information is a sequence number (SN).

For beneficial effects of the data transmission apparatus provided in the twenty-fourth aspect, refer to beneficial effects brought by the twentieth aspect, and details are not described herein again.

According to a twenty-fifth aspect, this application provides a receive end, including:

a processor, configured to determine an RLC PDU, where the RLC PDU includes at least one format indicator field, the format indicator field is used to indicate whether a specified area corresponding to the format indicator field includes a specific indicator field, and each of the at least one format indicator field corresponds to one specified area; and a transmitter, configured to send the RLC PDU through a lower layer of present protocol layer.

In a possible implementation, the specific indicator field includes a consecutively lost packet SN indicator field, and/or an SOstart field, and/or an SOend field.

For beneficial effects of the data transmission apparatus provided in the twenty-fifth aspect, refer to beneficial effects brought by the twenty-first aspect, and details are not described herein again.

According to a twenty-sixth aspect, this application provides a transmit end, including at least one processing element (or chip) for performing the method in the twentieth aspect.

According to a twenty-seventh aspect, this application provides a receive end, including at least one processing element (or chip) for performing the method in the twenty-first aspect.

According to a twenty-eighth aspect, this application provides a readable storage medium, where the readable storage medium stores an executable instruction. When at least one processor of a receive end executes the executable instruction, a transmit end performs the data transmission method provided in the twentieth aspect.

According to a twenty-ninth aspect, this application provides a readable storage medium, where the readable storage medium stores an executable instruction. When at least one processor of a transmit end executes the executable instruction, a receive end performs the data transmission method provided in the twenty-first aspect.

According to a thirtieth aspect, this application provides a program product, where the program product includes an executable instruction, and the executable instruction is stored in a readable storage medium. At least one processor of a receive end may read the executable instruction from the readable storage medium, and the at least one processor executes the executable instruction, so that a transmit end implements the data transmission method provided in the twentieth aspect.

According to a thirty-first aspect, this application provides a program product, where the program product includes an executable instruction, and the executable instruction is stored in a readable storage medium. At least one processor of a transmit end may read the executable instruction from the readable storage medium, and the at least one processor executes the executable instruction, so that a receive end implements the data transmission method provided in the twenty-first aspect.

Figure 8:
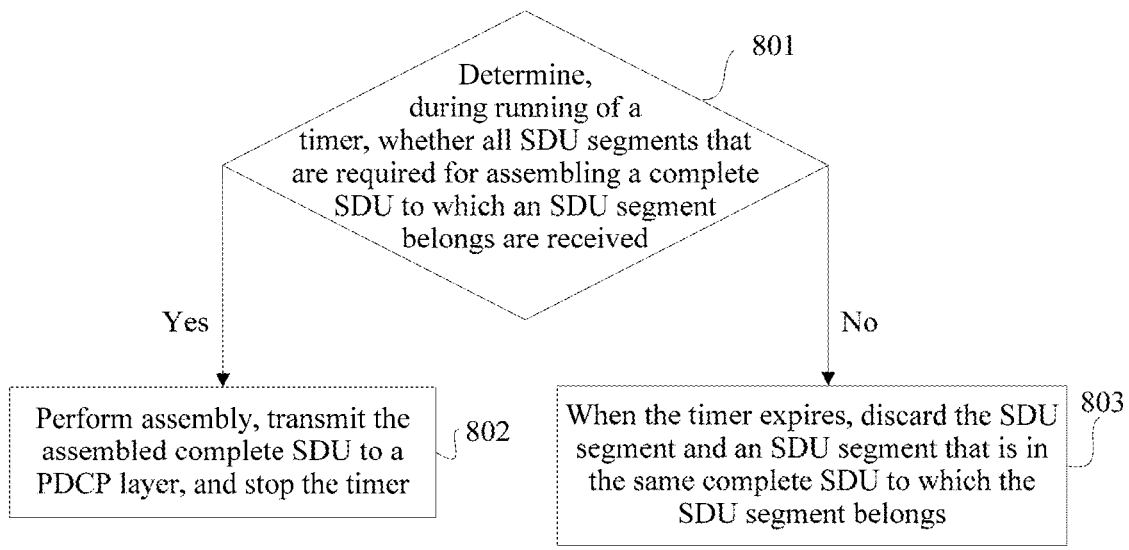
Figure 9:
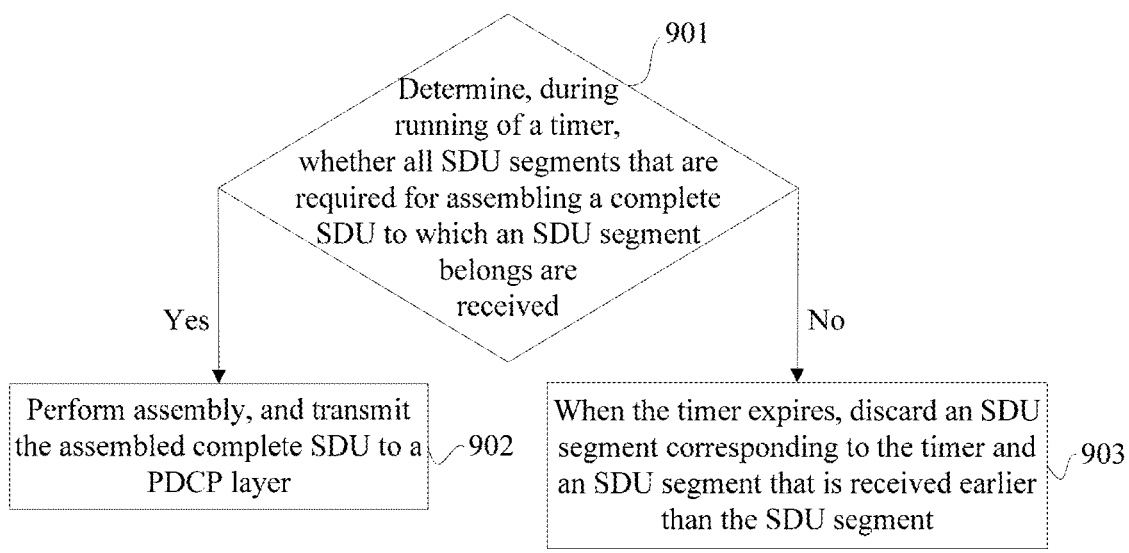
Figure 10:
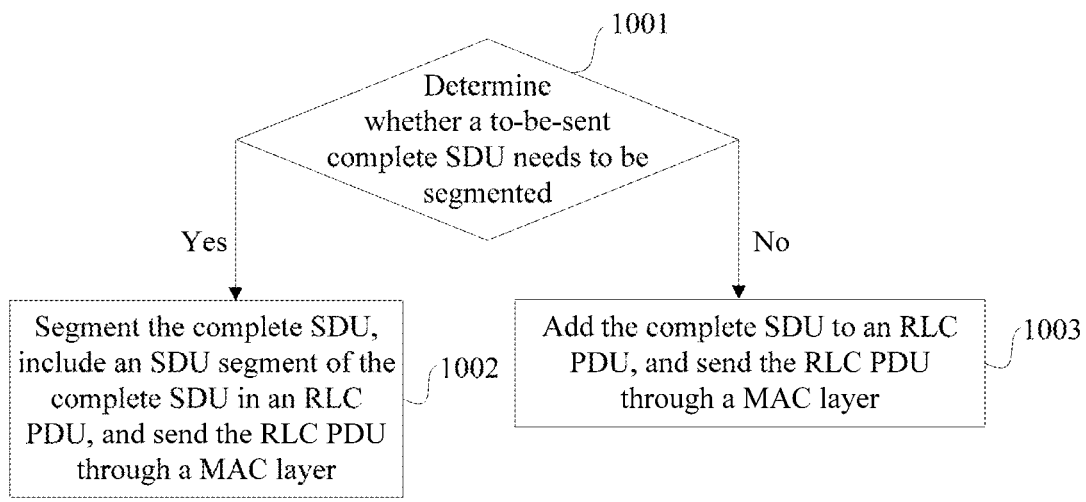
Figure 11:
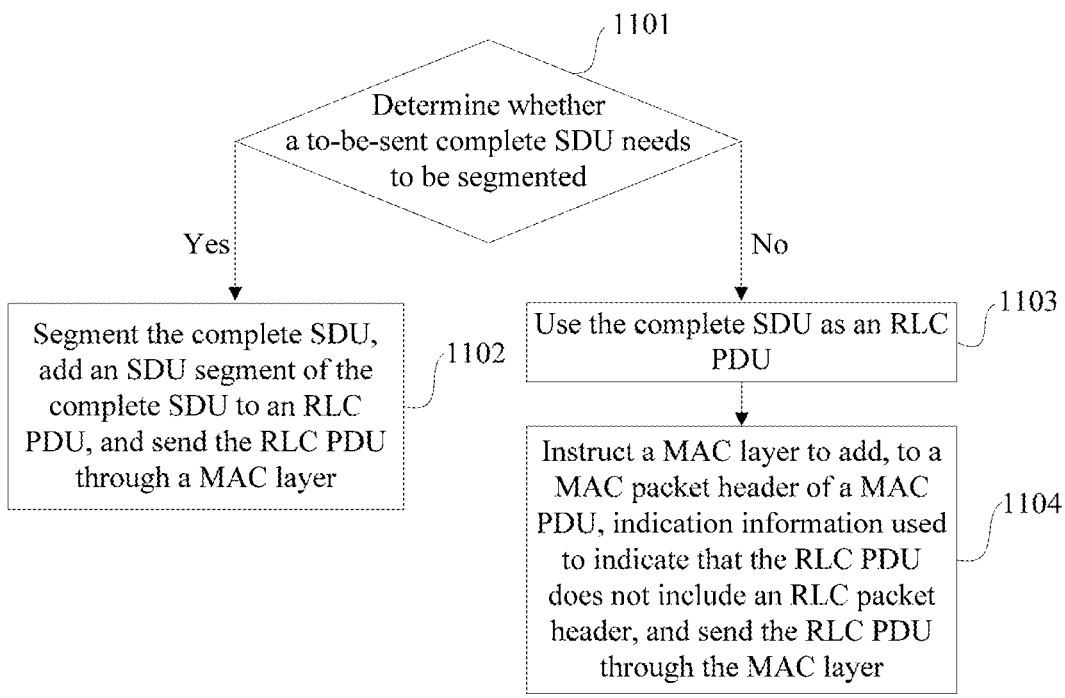
Figure 12:
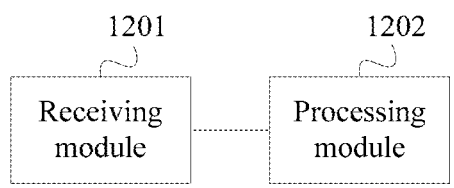
Figure 13:
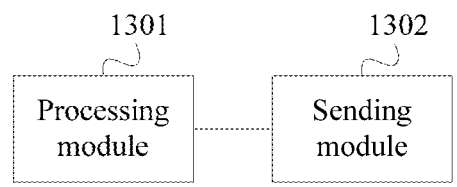
Figure 14:
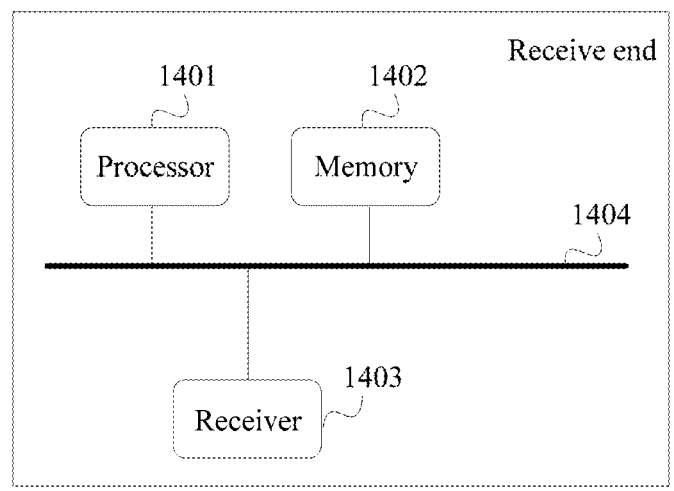
Figure 15:
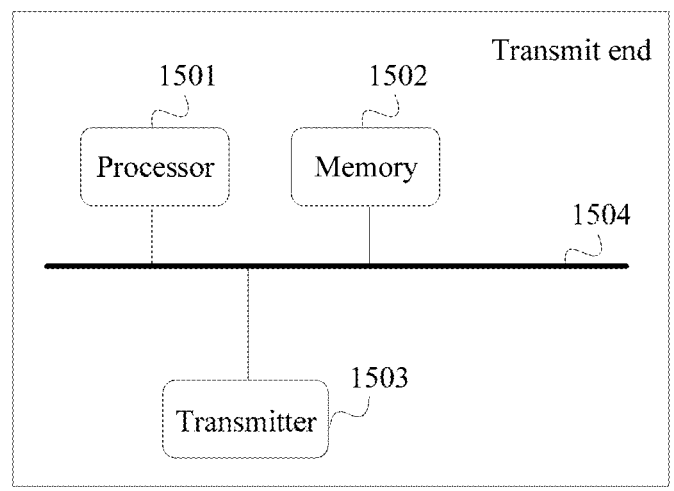
Figure 16:
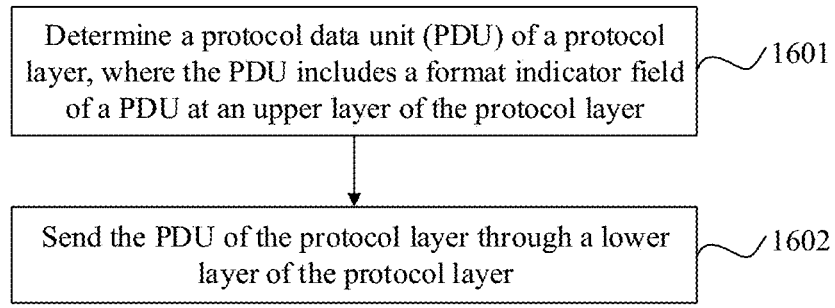
Figure 17:
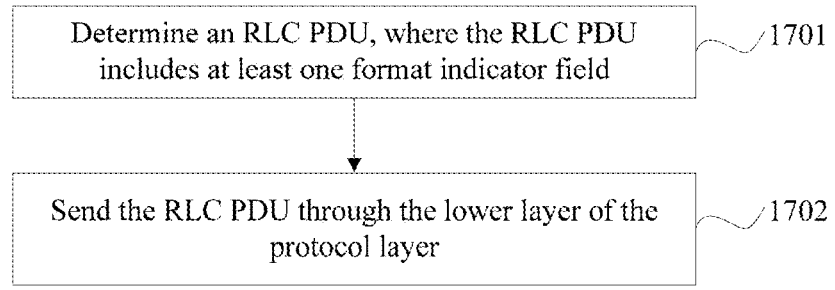
Figure 18:
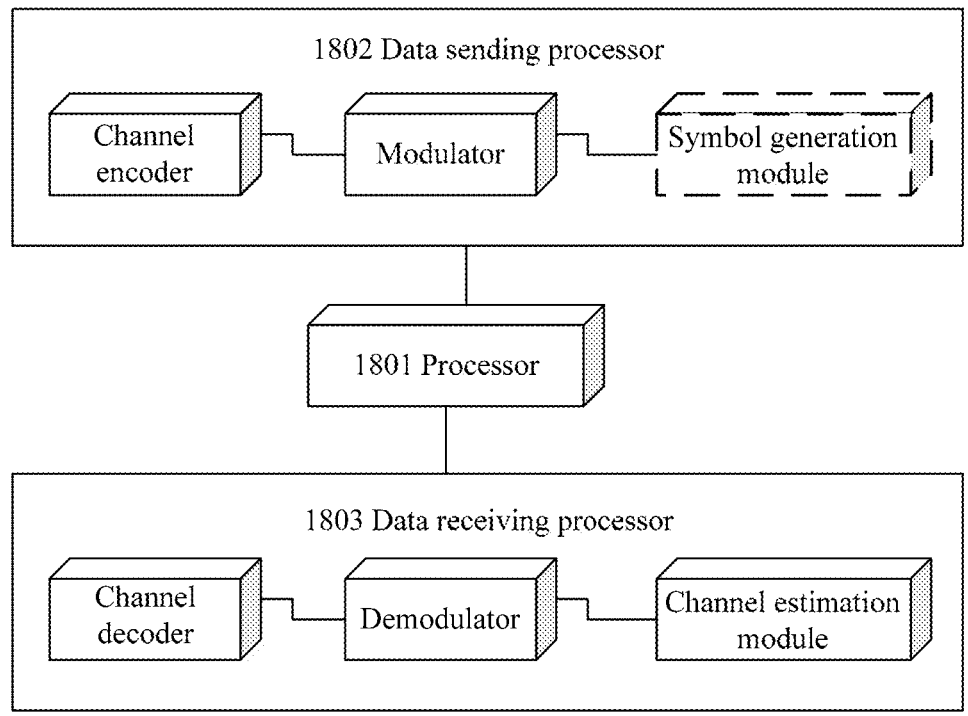
Figure 19:
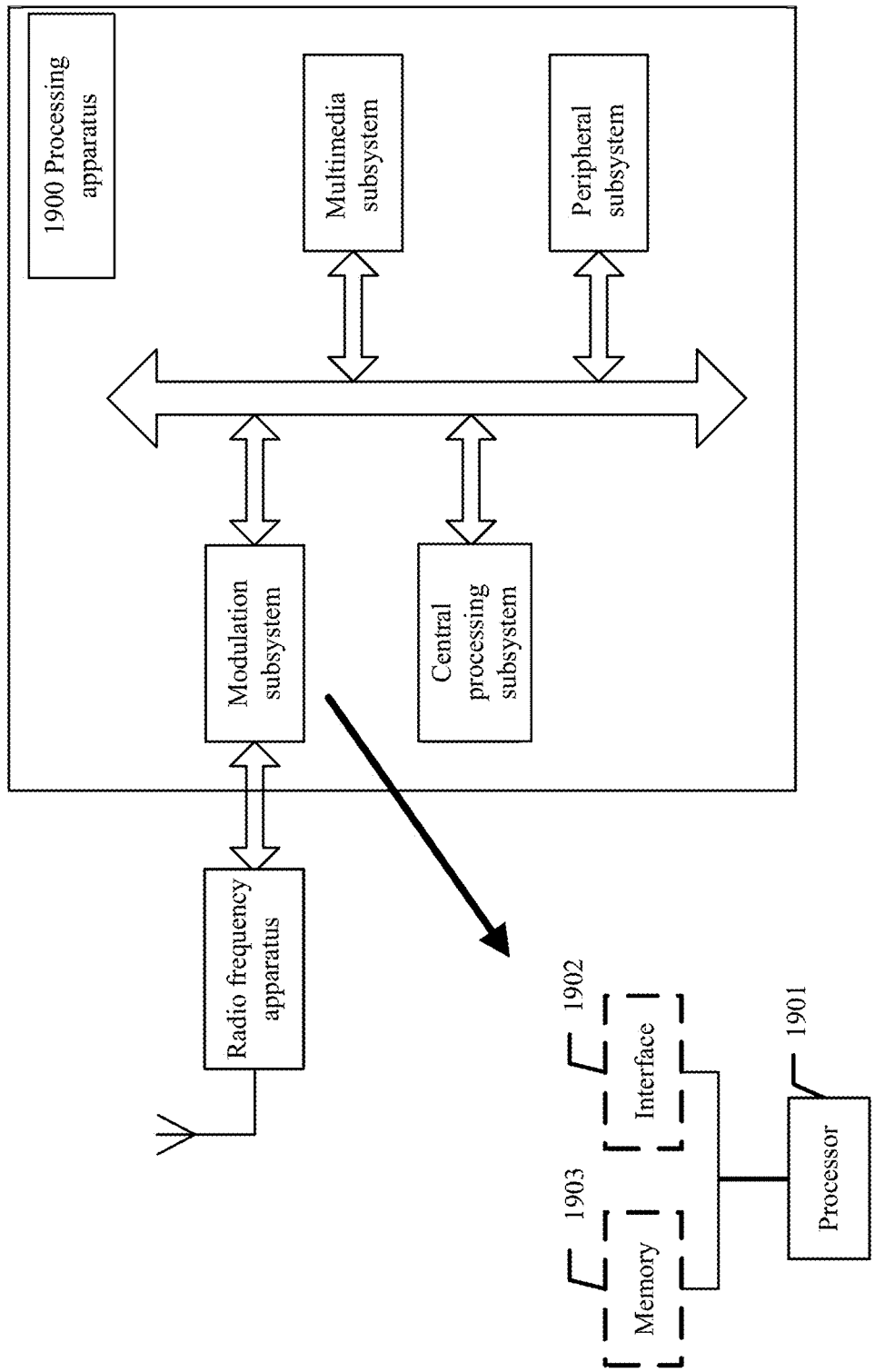

Each of FIG. 4 to FIG. 7B is a schematic diagram of a buffer window according to this application;

FIG. 8 is a flowchart of a data transmission method according to still another embodiment of this application;

FIG. 9 is a flowchart of a data transmission method according to yet another embodiment of this application;

FIG. 10 is a flowchart of a data transmission method according to still yet another embodiment of this application;

FIG. 11 is a flowchart of a data transmission method according to a further embodiment of this application;

FIG. 12 is a schematic structural diagram of a data transmission apparatus according to an embodiment of this application;

FIG. 13 is a schematic structural diagram of a data transmission apparatus according to another embodiment of this application;

FIG. 14 is a schematic structural diagram of a receive end according to an embodiment of this application;

FIG. 15 is a schematic structural diagram of a transmit end according to an embodiment of this application;

FIG. 16 is a flowchart of a data transmission method according to a still further embodiment of this application;

FIG. 17 is a flowchart of a data transmission method according to a yet further embodiment of this application;

FIG. 18 is a schematic structural diagram of a device according to an embodiment of this application; and FIG. 19 is a schematic structural diagram of a device according to another embodiment of this application.

DESCRIPTION OF EMBODIMENTS

An application background of this application is: in a 5G network, functions of reordering and duplicate detection are no longer performed in UM at an RLC layer, and reordering and duplicate detection are performed at a PDCP layer.

This application is applicable to a user equipment (UE) and a base station in a 5G network (gNB). When the UE sends data to the gNB, the UE is a transmit end, and the gNB is a receive end; and when the gNB sends data to the UE, the gNB is a transmit end, and the UE is a receive end. The receive end may be specifically an RLC entity at the receive end, and the transmit end may be specifically an RLC entity at the transmit end. It should be noted that this application is only for a scenario of data transmission in UM at the RLC layer.

The following describes technical solutions of this application in detail with reference to exemplary embodiments. The following exemplary embodiments may be combined with each other, and same or similar concepts or processes may not be repeatedly described in some embodiments.

Figure 1:
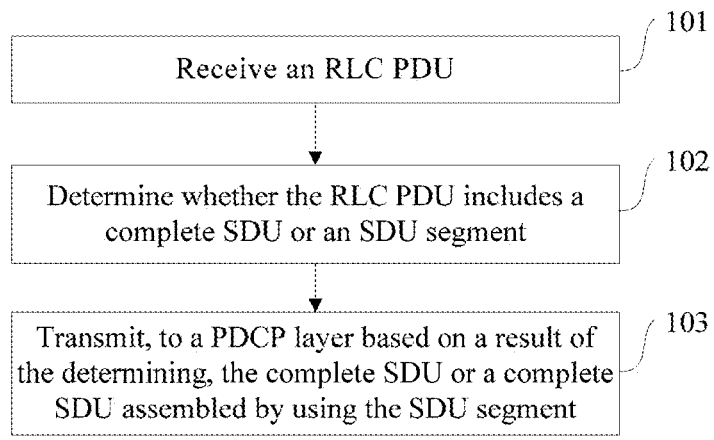
FIG. 1 is a flowchart of a data transmission method according to an embodiment of this application.

FIG. 1 is a flowchart of a data transmission method according to an embodiment of this application. The data transmission method provided in this embodiment of this application may be performed by a receive end. As shown in FIG. 1, the method in this embodiment may include the following steps.

Step 101: Receive an RLC protocol data unit (PDU).

The RLC PDU is transmitted in UM. The RLC PDU may include a complete service data unit (SDU) or an SDU segment. When a transmit end assembles an SDU into an RLC PDU, to adapt to a resource size indicated by a MAC layer, the transmit end needs to first segment the SDU in some cases. The complete SDU herein is assembled into an RLC PDU without being segmented, and the SDU segment is assembled into an RLC PDU after being segmented from the SDU. It should be noted that the SDU in this application is specifically an RLC SDU.

Step 102: Determine whether the RLC PDU includes a complete SDU or an SDU segment.

Whether the RLC PDU includes a complete SDU or an SDU segment may be determined in the following two manners.

Manner 1: Whether the RLC PDU includes a complete SDU or an SDU segment may be determined based on a framing info (FI) field in an RLC header of the RLC PDU. The FI field is used to indicate whether the RLC PDU includes a complete SDU. When the FI field indicates that a complete SDU is not included, the RLC PDU includes an SDU segment. Optionally, when the FI field indicates that a complete SDU is included, the RLC header of the RLC PDU does not include a sequence number (SN) of the complete SDU.

Manner 2: Whether the RLC PDU includes a complete SDU or an SDU segment may be determined based on an RLC header of the RLC PDU. When the RLC PDU does not include an RLC header, the RLC PDU includes a complete SDU. When the RLC PDU includes an RLC header, the RLC PDU includes an SDU segment.

Figure 2:
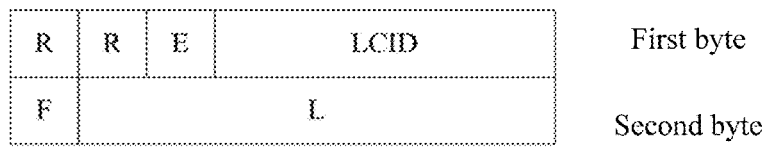
FIG. 2 is a schematic diagram of a MAC header in the prior art.

Optionally, whether the RLC PDU includes an RLC header may be determined based on indication information that is in a MAC header of a MAC PDU including the RLC PDU and that is used to indicate whether the RLC PDU includes an RLC header. Specifically, whether the RLC PDU includes an RLC header may be indicated by adding an indicator field to an existing MAC header; or whether the RLC PDU includes an RLC header may be indicated by using a reserved bit in an existing MAC header. For example, for a MAC header shown in FIG. 2, one byte may be added between a first byte and a second byte, and one bit in the newly added byte is used as the newly added indicator field for indication; or any reserved bit (R) in the first byte may be used for indication. In addition, E in FIG. 2 represents an extension field, and indicates whether there are more fields following the MAC header. LCD represents a logical channel identifier, and indicates a logical channel to which the RLC PDU belongs, or a corresponding MAC control element (CE), or a padding type. F represents a format field, and indicates a size of a length field (L field). L represents a length field, and indicates a length of a corresponding RLC PDU or a length of a size-variable MAC CE in bytes, and a quantity of bits occupied by L may be 7, 15, 16, 17, or another value.

Step 103: Transmit, to a PDCP layer based on a result of the determining, the complete SDU or a complete SDU assembled by using the SDU segment.

When the result of the determining is that the RLC PDU includes a complete SDU, the complete SDU included in the RLC PDU is transmitted to the PDCP layer. When the result of the determining is that the RLC PDU includes an SDU segment, optionally, the complete SDU assembled by using the SDU segment may be transmitted to the PDCP layer by using the following three methods.

Figure 3:
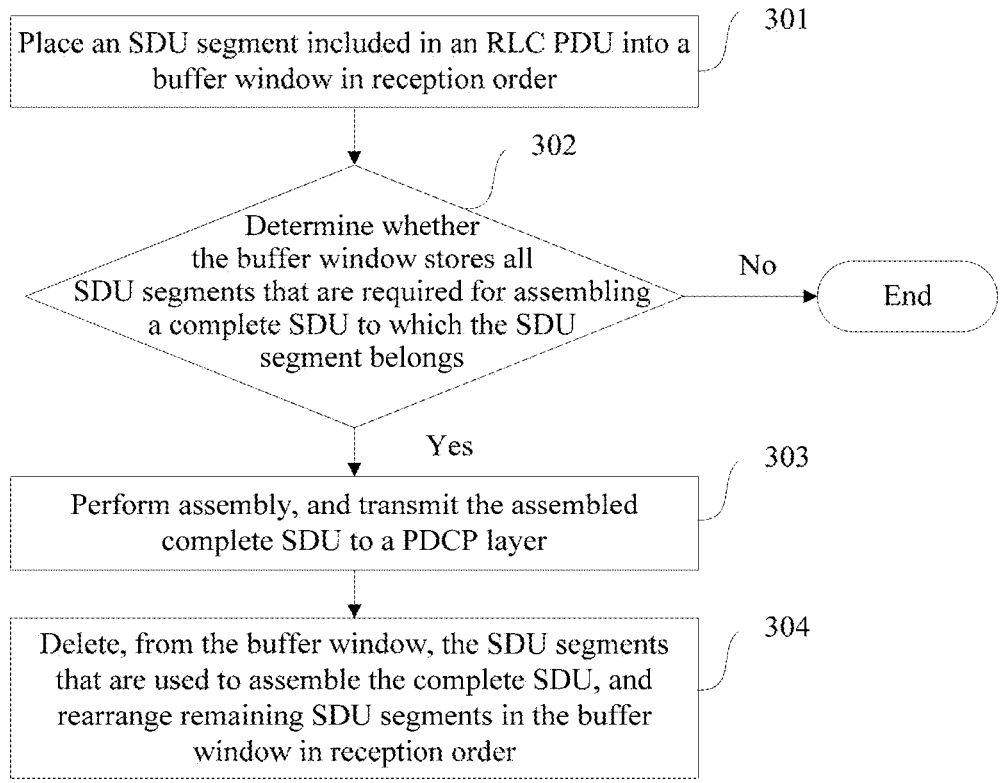
FIG. 3 is a flowchart of a data transmission method according to another embodiment of this application.

In a first method, the complete SDU assembled by using the SDU segment is transmitted to the PDCP layer by using a buffer window. As shown in FIG. 3, the method may include the following steps.

Step 301: Place the SDU segment included in the RLC PDU into a buffer window in reception order.

The buffer window stores, in reception order, M SDU segments that are latest received and that fail to be assembled into a complete SDU, where M is an integer greater than 0 and less than or equal to a size of the buffer window. For example, it is assumed that when the size of the buffer window is 8 and the buffer window is empty, seven SDU segments, which are respectively a segment 1, a segment 2, a segment 3, a segment 4, a segment 5, a segment 6, and a segment 7, are successively received, and then SDU segments in the buffer window may be shown in FIG. 4.

Step 302: Determine whether the buffer window stores all SDU segments that are required for assembling the complete SDU to which the SDU segment belongs.

When the buffer window stores all the SDU segments that are required for assembling the complete SDU to which the SDU segment belongs, step 303 is performed; otherwise, the process ends.

Step 303: Perform assembly, and transmit the assembled complete SDU to the PDCP layer.

Specifically, all the SDU segments that are required for assembling the complete SDU to which the SDU segment belongs are assembled, and the assembled complete SDU is transmitted to the PDCP layer.

Step 304: Delete, from the buffer window, the SDU segments that are used to assemble the complete SDU, and rearrange remaining SDU segments in the buffer window in reception order.

For example, in the buffer window shown in FIG. 4, it is assumed that the complete SDU has three SDU segments, which are respectively the segment 1, the segment 2, and the segment 4. After the segment 1, the segment 2, and the segment 4 are deleted, and remaining segments in the buffer window are rearranged in reception order, SDU segments in the buffer window are shown in FIG. 5.

Optionally, before step 301 to step 303, the method may further include: when a quantity of segments in the buffer window is equal to the size of the buffer window, deleting, from the buffer window, a first received SDU segment and another SDU segment that is in a same complete SDU to which the first received SDU segment belongs, and rearranging remaining SDU segments in the buffer window in reception order.

For example, as shown in FIG. 6A, it is assumed that the size of the buffer window is 10; before step 301 to step 303, the buffer window has stored eight SDU segments: a segment a to a segment h; the segment a is a first received SDU segment; and the segment a, the segment c, the segment d, and the segment f belong to a same complete SDU. After the segment a and other SDU segments that are in the same complete SDU to which the segment a belongs are deleted, and remaining SDU segments in the buffer window are rearranged in reception order, SDU segments in the buffer window may be shown in FIG. 6B.

Optionally, a timer may be further introduced, to clear one or more unused SDU segments that are in the buffer window and that fail to form a complete SDU in a long time. The method may include: restarting a timer when a first received SDU segment in the buffer window is updated; and when the timer expires, deleting, from the buffer window, N first received SDU segments and another SDU segment that is in a same complete SDU to which each of the N SDU segments belongs, and rearranging remaining SDU segments in the buffer window in reception order, where N is an integer greater than 0 and less than or equal to the size of the buffer window.

For example, as shown in FIG. 6A and FIG. 6B, when the first received SDU segment in the buffer window is changed from the segment a to the segment b, that is, when the first received SDU segment in the buffer window is updated, the timer is restarted. As shown in FIG. 7A, a segment i to a segment 1 are successively received during running of the timer. After the segment b, the segment j, and the segment 1 form a complete SDU, and the complete SDU is reported to the PDCP, SDU segments in the buffer window are shown in FIG. 7B. As shown in FIG. 7A and FIG. 7B, because the first received SDU segment in the buffer window is changed from the segment b to the segment e, the timer is restarted. During the running of the timer, if the segment e fails to form a complete SDU with another SDU segment to be reported to the PDCP, when the timer expires, the segment e and an SDU segment that is in a same complete SDU to which the segment e belongs may be deleted from the buffer window, or the segment e, the segment g, an SDU segment that is in a same complete SDU to which the segment e belongs, and an SDU segment that is in a same complete SDU to which the segment g belongs may be deleted from the buffer window.

Optionally, the size of the buffer window may be configured by a network, and the size of the buffer window may be configured by using radio resource control (RRC) signaling. A specific size may be determined based on an SN length, and may be one $P^{th}$ of a maximum SDU quantity that can be indicated by the SN length. For example, if the SN length is 10 bits, the maximum indicated SDU quantity is $2^{\wedge}10=1024$; and if P=2, the size of the buffer window is 1024/2=512. A value of P may be fixed, or may be configured by the network and by using RRC signaling.

The complete SDU assembled by using the SDU segment is transmitted to the PDCP layer by using the buffer window, thereby avoiding that the SDU segment is retained in a buffer for a long time to occupy the buffer.

In a second method, the complete SDU assembled by using the SDU segment is transmitted to the PDCP layer in a manner that one complete SDU corresponds to one timer. As shown in FIG. 8, the method may include the following steps.

Step 801: Determine, during running of a timer, whether all SDU segments that are required for assembling the complete SDU to which the SDU segment belongs are received.

When all the SDU segments that are required for assembling the complete SDU to which the SDU segment belongs are received, step 802 is performed. When not all the SDU segments that are required for assembling the complete SDU to which the SDU segment belongs are received, step 803 is performed.

The timer corresponds to the complete SDU to which the SDU segment belongs, that is, one complete SDU corresponds to one timer. A correspondence between the complete SDU and the timer may be dynamically configured, or may be statically configured. This is not limited herein. Optionally, considering that total duration of waiting for reception of all SDU segments of a complete SDU should not exceed a specific threshold, the timer corresponding to the complete SDU to which the SDU segment belongs may be started only when the SDU segment included in the RLC PDU is a first received SDU segment of the complete SDU to which the SDU segment belongs. Alternatively, considering that duration of waiting for reception of a next SDU segment that is in a same complete SDU to which an SDU segment belongs should not exceed a specific threshold, the timer corresponding to the complete SDU to which the SDU segment belongs may be restarted when any SDU segment in the complete SDU to which the SDU segment belongs is received.

Specifically, before step 801, the method may include: determining whether the SDU segment included in the RLC PDU is a first received SDU segment of the complete SDU to which the SDU segment belongs; and when the SDU segment included in the RLC PDU is the first received SDU segment of the complete SDU to which the SDU segment belongs, starting the timer corresponding to the complete SDU to which the SDU segment belongs, and performing step 801 after the timer is started; or when the SDU segment included in the RLC PDU is not the first received SDU segment of the complete SDU to which the SDU segment belongs, performing step 801.

Alternatively, before step 801, the method may include: determining whether the timer corresponding to the complete SDU to which the SDU segment belongs is running; and when the timer is running, restarting the timer, and performing step 801 after the timer is restarted; or when the timer is not running, starting the timer, and performing step 801 after the timer is started.

Step 802: Perform assembly, transmit the assembled complete SDU to the PDCP layer, and stop the timer.

Specifically, all the SDU segments that are required for assembling the complete SDU to which the SDU segment belongs are assembled, and the assembled complete SDU is transmitted to the PDCP layer. After determining the SDU segment and another SDU segment can be assembled into the complete SDU, the timer can be stopped.

Step 803: When the timer expires, discard the SDU segment and an SDU segment that is in the same complete SDU to which the SDU segment belongs.

When the timer expires, a complete SDU fails to be assembled within a time range specified by the timer. Therefore, the SDU segment and an SDU segment that is in the same complete SDU to which the SDU segment belongs are discarded.

Only that the timer corresponding to the complete SDU to which the SDU segment belongs is started when the SDU segment included in the RLC PDU is the first received SDU segment of the complete SDU to which the SDU segment belongs is taken for example. It is assumed that a timer 1 corresponds to a complete SDU 1; the complete SDU 1 has four SDU segments: a segment 1, a segment 2, a segment 3, and a segment 4; and a first received SDU segment of the complete SDU 1 is the segment 1. The timer 1 is started when the segment 1 is received. Then, when the segment 2, the segment 3, and the segment 4 are received in during running of the timer 1, the segment 1 to the segment 4 are assembled into the complete SDU 1, the complete SDU 1 is transmitted to the PDCP, and the timer 1 is stopped; or when only the segment 2 and the segment 3 are received during running of the timer 1, that is not all SDU segments of the complete SDU 1 are received in a time range specified by the timer 1, and therefore when the timer 1 expires, the segment 1, the segment 2, and the segment 3 are discarded.

The timer corresponding to the complete SDU to which the SDU segment belongs is started when any one SDU segment of the complete SDU to which the SDU segment belongs is received is taken for example. It is assumed that a timer 1 corresponds to a complete SDU 1; the complete SDU 1 has four SDU segments: a segment 1, a segment 2, a segment 3, and a segment 4; and a first received SDU segment of the complete SDU 1 is the segment 1.

In one scenario, the timer 1 is started when the segment 1 is received. Then, the timer 1 is restarted when the segment 2 is received in during running of the timer 1. Then, the timer 1 is restarted when the segment 3 is received during the running of the timer 1. Then, when the segment 4 is received during the running of the timer 1, the segment 1 to the segment 4 are assembled into the complete SDU 1, the complete SDU 1 is transmitted to the PDCP, and the timer 1 is stopped.

In another scenario, the timer 1 is started when the segment 1 is received. Then, the timer 1 is restarted when the segment 2 is received during running of the timer 1. Then, the timer 1 is restarted when the segment 3 is received during the running of the timer 1. Then, when the segment 4 is not received during the running of the timer 1, that is a next SDU segment of the complete SDU 1 is not received within a time range specified by the timer 1, and therefore when the timer 1 expires, the segment 1, the segment 2, and the segment 3 are discarded.

The complete SDU assembled by using the SDU segment is transmitted to the PDCP layer in a manner that one complete SDU corresponds to one timer, thereby avoiding that SDU segments belonging to a same complete SDU are retained in a buffer for a long time to occupy the buffer.

In a third method, the complete SDU assembled by using the SDU segment is transmitted to the PDCP layer in a manner that all SDU segments correspond to one timer. As shown in FIG. 9, the method may include the following steps.

Step 901: Determine, during running of a timer, whether all SDU segments that are required for assembling the complete SDU to which the SDU segment belongs are received.

When all the SDU segments that are required for assembling the complete SDU to which the SDU segment belongs are received, step 902 is performed. When not all the SDU segments that are required for assembling the complete SDU to which the SDU segment belongs are received, step 903 is performed. The timer corresponds to an SDU segment. The SDU segment corresponding to the timer may be the SDU segment included in the RLC PDU, or may be an SDU segment that is received earlier than the SDU segment included in the RLC PDU.

Step 902: Perform assembly, and transmit the assembled complete SDU to the PDCP layer.

Specifically, all the SDU segments that are required for assembling the complete SDU to which the SDU segment belongs are assembled, and the assembled complete SDU is transmitted to the PDCP layer.

Step 903: When the timer expires, discard an SDU segment corresponding to the timer and an SDU segment that is received earlier than the SDU segment corresponding to the timer.

The timer is set to limit duration for the SDU segment corresponding to the timer and the SDU segment that is received earlier than the SDU segment corresponding to the timer to wait for assembly. When the timer expires, that the duration for the SDU segment corresponding to the timer and the SDU segment that is received earlier than the SDU segment corresponding to the timer to wait for assembly is excessively long. Therefore, the SDU segment corresponding to the timer and the SDU segment that is received earlier than the SDU segment corresponding to the timer need to be discarded.

Optionally, there may be the following two trigger conditions to trigger the timer. Specifically, a trigger condition 1 for starting the timer may be: When the RLC PDU is received, whether the timer is running is determined; and when the timer is not running, the SDU segment included in the RLC PDU is determined as the SDU segment corresponding to the timer, and the timer is started. A trigger condition 2 for starting the timer may be: When the timer expires, whether there is an SDU segment that waits for assembly is determined; and when there is an SDU segment that waits for assembly, a latest received SDU segment of all SDU segments that wait for assembly is determined to be corresponding to the timer, and the timer is started. It should be noted that, in actual application, only the trigger condition 1 may be used, or both the trigger condition 1 and the trigger condition 2 may be used.

The trigger condition 1 is used as an example. It is assumed that there are already five SDU segments that wait for assembly, the five SDU segments are sequentially a segment 1 to a segment 5 in reception order, the segment 3 corresponds to a timer 2, and the segment 4 and the segment 5 are received during running of the timer 2. When the timer 2 expires, the segment 1, the segment 2, and the segment 3 are discarded, and when another SDU segment is received after the timer 2 expires, the timer 2 is restarted.

If only the trigger condition 1 is used, in a special scenario, a time for an SDU segment to wait for assembly is excessively long, and a time for occupying a buffer is excessively long. Specifically, when no more SDU segment is received in a long time after the timer 2 expires, a time for the segment 4 and the segment 5 to wait for assembly is excessively long, and a time for occupying a buffer is excessively long. Based on this, the trigger condition 2 may be further used.

The trigger condition 2 is used as an example. It is assumed that there are already five SDU segments that wait for assembly, the five SDU segments are sequentially a segment 1 to a segment 5 in reception order, the segment 3 corresponds to a timer 2, and the segment 4 and the segment 5 are received during running of the timer 2. When the timer 2 expires, the segment 1, the segment 2, and the segment 3 are discarded, the timer 2 is determined to correspond to the segment 5, and the timer 2 is started. When no more SDU segment is received in a long time after the timer 2 expires, because the timer 2 corresponds to the segment 5 and the timer 2 is started, the time for the segment 4 and the segment 5 to wait for assembly is not excessively long, and the time for occupying a buffer is not excessively long.

In step 903, after the SDU segment corresponding to the timer and the SDU segment that is received earlier than the SDU segment corresponding to the timer are discarded when the timer expires, an SDU segment that is received later than the SDU segment corresponding to the timer and that is in a same complete SDU to which the discarded SDU segment belongs is already meaningless. Therefore, when the timer expires, the SDU segment that is received later than the SDU segment corresponding to the timer and that is in the same complete SDU to which the discarded SDU segment belongs may be further discarded, to save buffer space. Specifically, after step 903, the method may further include: optionally, when the timer expires, discarding an SDU segment that is received later than the SDU segment corresponding to the timer and that is in a same complete SDU to which the SDU segment corresponding to the timer belongs, and discarding an SDU segment that is received later than the SDU segment corresponding to the timer and that is in a same complete SDU to which each of K SDU segments belongs, where the K SDU segments are SDU segments that are received earlier than the SDU segment corresponding to the timer, and K is an integer greater than or equal to 0.

The complete SDU assembled by using the SDU segment is transmitted to the PDCP layer in a manner that all SDU segments correspond to a same timer, thereby avoiding that the SDU segment corresponding to the timer and the SDU segment that is received earlier than the SDU segment corresponding to the timer are retained in a buffer for a long time to occupy the buffer.

According to the data transmission method provided in this embodiment of this application, the receive end determines whether the RLC PDU includes a complete SDU or an SDU segment, and transmits, to the PDCP layer based on the result of the determining, the complete SDU or a complete SDU assembled by using the SDU segment, thereby implementing data reception in UM at the RLC layer in 5G. In addition, because the receive end directly transmits a complete SDU to the PDCP layer, a processing delay caused by waiting for reordering at the RLC layer is avoided.

FIG. 10 is a flowchart of a data transmission method according to still yet another embodiment of this application. The data transmission method provided in this embodiment of this application may be performed by a transmit end. As shown in FIG. 10, the method in this embodiment may include the following steps.

Step 1001: Determine whether a to-be-sent complete SDU needs to be segmented.

When the to-be-sent complete SDU needs to be segmented, step 1002 is performed. When the to-be-sent complete SDU does not need to be segmented, step 1003 is performed. Specifically, whether the to-be-sent complete SDU needs to be segmented may be determined based on a size of an RLC PDU that is allowed to be transmitted and that is indicated in a transmission opportunity notified by a MAC layer.

Step 1002: Segment the complete SDU, add an SDU segment of the complete SDU to an RLC PDU, and send the RLC PDU through a MAC layer.

An RLC header of the RLC PDU includes a sequence number (SN) of the complete SDU. The RLC PDU is transmitted in UM.

Step 1003: Add the complete SDU to an RLC PDU, and send the RLC PDU through a MAC layer.

An RLC header of the RLC PDU does not include an SN of the complete SDU, and the RLC PDU is transmitted in UM. An SN in a 4th Generation mobile communications technology (4th Generation, 4G) is used to identify a transmission sequence number of an RLC PDU at a transmit end, to facilitate reordering and duplicate detection at a receive end. To be specific, an RLC PDU that has a small transmission sequence number is first transmitted. If in-order delivery is required at an RLC layer of the receive end, reordering needs to be first performed based on the SN, and then delivery to a PDCP layer is performed. In addition, if packets having a same sequence number are received, duplication occurs, and one packet needs to be discarded before delivery is performed. In 5G, reordering and duplicate detection do not need to be performed at an RLC layer of the receive end, and a complete SDU is directly delivered to the PDCP layer when the complete SDU is received at the RLC layer, and therefore an SN is no longer required. An SDU segment needs to be assembled into a complete SDU before delivery, specific SDU segments belonging to a same complete SDU need to be identified, and therefore SNs are still required to identify the SDU segments.

It should be noted that this embodiment describes an implementation on a peer side of the embodiment shown in FIG. 1, explanations of related terms in this embodiment are the same as those in the embodiment shown in FIG. 1, and details are not described herein again.

According to the data transmission method provided in this embodiment of this application, when determining that the to-be-sent complete SDU does not need to be segmented, the transmit end adds the complete SDU to the RLC PDU, and sends the RLC PDU through the MAC layer, where the RLC header of the RLC PDU does not include the SN of the complete SDU, so that data transmission in UM at the RLC layer in 5G is implemented. In addition, because the RLC header of the RLC PDU that includes the complete SDU does not include the SN of the complete SDU, transmission overheads can be reduced.

FIG. 11 is a flowchart of a data transmission method according to a further embodiment of this application. The data transmission method provided in this embodiment of this application may be performed by a transmit end. As shown in FIG. 11, the method in this embodiment may include the following steps.

Step 1101: Determine whether a to-be-sent complete SDU needs to be segmented.

When the to-be-sent complete SDU needs to be segmented, step 1102 is performed. When the to-be-sent complete SDU does not need to be segmented, step 1103 is performed. Specifically, whether the to-be-sent complete SDU needs to be segmented may be determined based on a size of an RLC PDU that is allowed to be transmitted and that is indicated in a transmission opportunity notified by a MAC layer.

Step 1102: Segment the complete SDU, add an SDU segment of the complete SDU to an RLC PDU, and send the RLC PDU through a MAC layer.

An RLC header of the RLC PDU may include a sequence number (SN) of the complete SDU. The RLC PDU is transmitted in UM.

Step 1103: Use the complete SDU as an RLC PDU.

An objective of the RLC header is to carry an SN, and for the complete SDU, the RLC header does not need to carry an SN. Therefore, the complete SDU may not include an RLC header. Therefore, the complete SDU may be used as the RLC PDU.

Step 1104: Instruct a MAC layer to add, to a MAC header of a MAC PDU, indication information used to indicate that the RLC PDU does not include an RLC header, and send the RLC PDU through the MAC layer.

The MAC PDU includes the RLC PDU, and the RLC PDU is transmitted in unacknowledged mode (UM).

It should be noted that this embodiment describes an implementation on a peer side of the embodiment shown in FIG. 1, explanations of related terms in this embodiment are the same as those in the embodiment shown in FIG. 1, and details are not described herein again.

According to the data transmission method provided in this embodiment of this application, when the transmit end determines that the to-be-sent complete SDU does not need to be segmented, the complete SDU is used as the RLC PDU, the MAC layer is instructed to add, to the MAC header of the MAC PDU, the indication information used to indicate that the RLC PDU does not include an RLC header, and the RLC PDU is sent through the MAC layer, so that data transmission in UM at an RLC layer in 5G is implemented. In addition, because the RLC PDU that includes the complete SDU does not include the RLC header, transmission overheads can be reduced.

FIG. 12 is a schematic structural diagram of a data transmission apparatus according to an embodiment of this application. The apparatus provided in this embodiment may be implemented as a part or all of a receive end by using software, hardware, or a combination thereof. As shown in FIG. 12, the apparatus may include: a receiving module 1201, configured to receive a Radio Link Control protocol data unit (RLC PDU); and a processing module 1202, configured to: determine whether the RLC PDU received by the receiving module 1201 includes a complete service data unit (SDU) or an SDU segment; and transmit, to a Packet Data Convergence Protocol (PDCP) layer based on a result of the determining, the complete SDU or a complete SDU assembled by using the SDU segment, where the RLC PDU is transmitted in unacknowledged mode (UM).

Optionally, that the processing module 1202 determines whether the received RLC PDU includes a complete service data unit (SDU) or an SDU segment includes: determining whether the RLC PDU includes an RLC header; and when the RLC PDU does not include an RLC header, determining that the RLC PDU includes a complete SDU; or when the RLC PDU includes an RLC header, determining that the RLC PDU includes an SDU segment.

Optionally, that the processing module 1202 determines whether the RLC PDU includes an RLC header includes: determining, based on indication information that is in a MAC header of a Media Access Control (MAC) PDU and that is used to indicate whether the RLC PDU includes an RLC header, whether the RLC PDU includes an RLC header, where the MAC PDU includes the RLC PDU.

Optionally, when the RLC PDU includes a complete SDU, the RLC header of the RLC PDU does not include a sequence number (SN) of the complete SDU.

Optionally, the processing module 1202 may specifically implement, in the following three manners, a function of transmitting, to the Packet Data Convergence Protocol (PDCP) layer based on the result of the determining, the complete SDU or a complete SDU assembled by using the SDU segment.

Manner 1

That the processing module 1202 transmits, to the Packet Data Convergence Protocol (PDCP) layer based on the result of the determining, the complete SDU or a complete SDU assembled by using the SDU segment includes:

when the result of the determining is that the RLC includes an SDU segment, placing the SDU segment into a buffer window in reception order, and determining whether the buffer window stores all SDU segments that are required for assembling the complete SDU to which the SDU segment belongs; and when the buffer window stores all the SDU segments that are required for assembling the complete SDU to which the SDU segment belongs, performing assembly, and transmitting the assembled complete SDU to the PDCP layer, where the buffer window stores, in reception order, M SDU segments that are latest received and that fail to be assembled into a complete SDU, and M is an integer greater than 0 and less than or equal to a size of the buffer window; or when the result of the determining is that the RLC PDU includes a complete SDU, transmitting the complete SDU included in the RLC PDU to the PDCP layer.

Optionally, the processing module 1202 is further configured to: delete, from the buffer window, the SDU segments that are used to assemble the complete SDU, and rearrange remaining SDU segments in the buffer window in reception order.

Optionally, the processing module 1202 is further configured to: when a quantity of segments in the buffer window is equal to the size of the buffer window, delete, from the buffer window, a first received SDU segment and another SDU segment that is in a same complete SDU to which the first received SDU segment belongs, and rearrange remaining SDU segments in the buffer window in reception order.

Optionally, the processing module 1202 is further configured to: restart a timer when the first received SDU segment in the buffer window is updated; and when the timer expires, delete, from the buffer window, N first received SDU segments and another SDU segment that is in a same complete SDU to which each of the N SDU segments belongs, and rearrange remaining SDU segments in the buffer window in reception order, where N is an integer greater than 0 and less than or equal to the size of the buffer window.

Manner 2

That the processing module 1202 transmits, to the Packet Data Convergence Protocol (PDCP) layer based on the result of the determining, the complete SDU or a complete SDU assembled by using the SDU segment includes:

when the result of the determining is that the RLC includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, transmitting the assembled complete SDU to the PDCP layer, and stopping the timer, where the timer corresponds to the complete SDU to which the SDU segment belongs; or when the result of the determining is that the RLC PDU includes a complete SDU, transmitting the complete SDU included in the RLC PDU to the PDCP layer.

Optionally, the processing module 1202 is further configured to: when the timer expires, discard the SDU segment and an SDU segment that is in the same complete SDU to which the SDU segment belongs.

Optionally, the processing module 1202 is further configured to start the timer when the SDU segment is a first received SDU segment of the complete SDU to which the SDU segment belongs.

Optionally, the processing module 1202 is further configured to: determine whether the timer is running; and restart the timer when the timer is running; or start the timer when the timer is not running.

Manner 3

That the processing module 1202 transmits, to the Packet Data Convergence Protocol (PDCP) layer based on the result of the determining, the complete SDU or a complete SDU assembled by using the SDU segment includes:

when the result of the determining is that the RLC PDU includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, and transmitting the assembled complete SDU to the PDCP layer, where the timer corresponds to an SDU segment; or when the result of the determining is that the RLC PDU includes a complete SDU, transmitting the complete SDU included in the RLC PDU to the PDCP layer.

Optionally, the processing module 1202 is further configured to: determine whether the timer is running; and when the timer is not running, determine that the SDU segment corresponding to the timer is the SDU segment included in the RLC PDU, and start the timer.

Optionally, the processing module 1202 is further configured to: when the timer expires, discard the SDU segment corresponding to the timer and an SDU segment that is received earlier than the SDU segment corresponding to the timer.

Optionally, the processing module 1202 is further configured to: when the timer expires, determine whether there is an SDU segment that waits for assembly; and when there is an SDU segment that waits for assembly, determine that the timer corresponds to a latest received SDU segment of all SDU segments that wait for assembly, and start the timer.

Optionally, the processing module 1202 is further configured to: when the timer expires, discard an SDU segment that is received later than the SDU segment corresponding to the timer and that is in a same complete SDU to which the discarded SDU segment belongs.

The data transmission apparatus provided in this embodiment may be configured to execute the technical solutions in any method embodiment in the method embodiments shown in FIG. 1, FIG. 3, FIG. 8, and FIG. 9. Implementation principles and technical effects of the technical solutions are similar to those of the method embodiments, and details are not described herein again.

FIG. 13 is a schematic structural diagram of a data transmission apparatus according to another embodiment of this application. The apparatus provided in this embodiment may be implemented as a part or all of a transmit end by using software, hardware, or a combination thereof. As shown in FIG. 13, the apparatus may include: a processing module 1301, configured to: determine whether a to-be-sent complete service data unit (SDU) needs to be segmented, and when the complete SDU does not need to be segmented, add the complete SDU to a Radio Link Control protocol data unit (RLC PDU), where an RLC header of the RLC PDU does not include an SN of the complete SDU; and a sending module 1302, configured to send, through a Media Access Control (MAC) layer, the RLC PDU obtained by the processing module 1301, where the RLC PDU is transmitted in unacknowledged mode (UM).

This application further provides a data transmission system, including the data transmission apparatus provided in this embodiment and the data transmission apparatus provided in the embodiment shown in FIG. 12.

The data transmission apparatus provided in this embodiment may be configured to execute the technical solutions in the method embodiment shown in FIG. 10. Implementation principles and technical effects of the technical solutions are similar to those of the method embodiment, and details are not described herein again.

This application may further provide a data transmission apparatus. The apparatus may be implemented as a part or all of a transmit end by using software, hardware, or a combination thereof. The apparatus has a structure the same as that of the apparatus shown in FIG. 13, and may also include a processing module and a sending module. The processing module is configured to: determine whether a to-be-sent complete SDU needs to be segmented; and when the complete service data unit (SDU) does not need to be segmented, use the complete SDU as a Radio Link Control protocol data unit (RLC PDU). The sending module is configured to instruct a Media Access Control (MAC) layer to add, to a MAC header of a MAC PDU, indication information used to indicate that the RLC PDU does not include an RLC header, and send the RLC PDU through the MAC layer, where the MAC PDU includes the RLC PDU, and the RLC PDU is transmitted in unacknowledged mode (UM).

This application further provides a data transmission system, including the data transmission apparatus provided in this embodiment and the data transmission apparatus provided in the embodiment shown in FIG. 12.

The data transmission apparatus provided in this embodiment may be configured to execute the technical solutions in the method embodiment shown in FIG. 11. Implementation principles and technical effects of the technical solutions are similar to those of the method embodiment, and details are not described herein again.

FIG. 14 is a schematic structural diagram of a receive end according to an embodiment of this application. The receive end may be, for example, a UE or a gNB. As shown in FIG. 14, the receive end may include a processor 1401, a memory 1402, a receiver 1403, and at least one communications bus 1404. The communications bus 1404 is configured to implement a communication connection between elements. The memory 1402 may include a high-speed random access memory (RAM) memory, and may further include a non-volatile memory (NVM), such as at least one magnetic disk storage. The memory 1402 may store various programs that are used to perform various processing functions and implement the method steps in the embodiments. The receiver 1403 in this embodiment may be a corresponding input interface that has a communication function and an information receiving function, or a radio frequency module or baseband module on the receive end.

In this embodiment, the receiver 1403 is configured to receive a Radio Link Control protocol data unit (RLC PDU).

The processor 1401 is configured to: determine whether the RLC PDU includes a complete service data unit (SDU) or an SDU segment; and transmit, to a Packet Data Convergence Protocol (PDCP) layer based on a result of the determining, the complete SDU or a complete SDU assembled by using the SDU segment, where the RLC PDU is transmitted in unacknowledged mode (UM).

Optionally, that the processor 1401 determines whether the RLC PDU includes a complete SDU or an SDU segment includes: determining whether the RLC PDU includes an RLC header; and when the RLC PDU does not include an RLC header, determining that the RLC PDU includes a complete SDU; or when the RLC PDU includes an RLC header, determining that the RLC PDU includes an SDU segment.

Optionally, that the processor 1401 determines whether the RLC PDU includes an RLC header includes: determining, based on indication information that is in a MAC header of a Media Access Control (MAC) PDU and that is used to indicate whether the RLC PDU includes an RLC header, whether the RLC PDU includes an RLC header, where the MAC PDU includes the RLC PDU.

Optionally, when the RLC PDU includes a complete SDU, the RLC header of the RLC PDU does not include a sequence number (SN) of the complete SDU.

Optionally, functions implemented by the processor 1401 may include the following three types.

Type 1

Optionally, that the processor 1401 transmits, to a PDCP layer based on a result of the determining, the complete SDU or a complete SDU assembled by using the SDU segment includes:

when the result of the determining is that the RLC includes an SDU segment, placing the SDU segment into a buffer window in reception order, and determining whether the buffer window stores all SDU segments that are required for assembling the complete SDU to which the SDU segment belongs, where the buffer window stores, in reception order, M SDU segments that are latest received and that fail to be assembled into a complete SDU; and when the buffer window stores all the SDU segments that are required for assembling the complete SDU to which the SDU segment belongs, performing assembly, and transmitting the assembled complete SDU to the PDCP layer, where M is an integer greater than 0 and less than or equal to a size of the buffer window; or when the result of the determining is that the RLC PDU includes a complete SDU, transmitting the complete SDU included in the RLC PDU to the PDCP layer.

Optionally, the processor 1401 is further configured to: delete, from the buffer window, the SDU segments that are used to assemble the complete SDU, and rearrange remaining SDU segments in the buffer window in reception order.

Optionally, the processor 1401 is further configured to: when a quantity of segments in the buffer window is equal to the size of the buffer window, delete, from the buffer window, a first received SDU segment and another SDU segment that is in a same complete SDU to which the first received SDU segment belongs, and rearrange remaining SDU segments in the buffer window in reception order.

Optionally, the processor 1401 is further configured to: restart a timer when the first received SDU segment in the buffer window is updated; and when the timer expires, delete, from the buffer window, N first received SDU segments and another SDU segment that is in a same complete SDU to which each of the N SDU segments belongs, and rearrange remaining SDU segments in the buffer window in reception order, where N is an integer greater than 0 and less than or equal to the size of the buffer window.

Type 2

Optionally, that the processor 1401 transmits, to a PDCP layer based on a result of the determining, the complete SDU or a complete SDU assembled by using the SDU segment includes:

when the result of the determining is that the RLC includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, transmitting the assembled complete SDU to the PDCP layer, and stopping the timer, where the timer corresponds to the complete SDU to which the SDU segment belongs; or when the result of the determining is that the RLC PDU includes a complete SDU, transmitting the complete SDU included in the RLC PDU to the PDCP layer.

Optionally, the processor 1401 is further configured to: when the timer expires, discard the SDU segment and an SDU segment that is in the same complete SDU to which the SDU segment belongs.

Optionally, the processor 1401 is further configured to start the timer when the SDU segment is a first received SDU segment of the complete SDU to which the SDU segment belongs.

Optionally, the processor 1401 is further configured to: determine whether the timer is running; and restart the timer when the timer is running; or start the timer when the timer is not running.

Type 3

Optionally, that the processor 1401 transmits, to a PDCP layer based on a result of the determining, the complete SDU or a complete SDU assembled by using the SDU segment includes:

when the result of the determining is that the RLC PDU includes an SDU segment, determining, during running of a timer, whether all SDU segments that are required for assembling the complete SDU to which the SDU segment belongs are received; and when all the SDU segments that are required for assembling the complete SDU to which the SDU segment belongs are received, performing assembly, and transmitting the assembled complete SDU to the PDCP layer, where the timer corresponds to an SDU segment; or when the result of the determining is that the RLC PDU includes a complete SDU, transmitting the complete SDU included in the RLC PDU to the PDCP layer.

Optionally, the processor 1401 is further configured to: determine whether the timer is running; and when the timer is not running, determine that the SDU segment corresponding to the timer is the SDU segment included in the RLC PDU, and start the timer.

Optionally, the processor 1401 is further configured to: when the timer expires, discard the SDU segment corresponding to the timer and an SDU segment that is received earlier than the SDU segment corresponding to the timer.

Optionally, the processor 1401 is further configured to: when the timer expires, determine whether there is an SDU segment that waits for assembly; and when there is an SDU segment that waits for assembly, determine that the timer corresponds to a latest received SDU segment of all SDU segments that wait for assembly, and start the timer.

Optionally, the processor 1401 is further configured to: when the timer expires, discard an SDU segment that is received later than the SDU segment corresponding to the timer and that is in a same complete SDU to which the discarded SDU segment belongs.

The receive end provided in this embodiment may be configured to execute the technical solutions in any method embodiment in the method embodiments shown in FIG. 1, FIG. 3, FIG. 8, and FIG. 9. Implementation principles and technical effects of the technical solutions are similar to those of the method embodiments, and details are not described herein again.

FIG. 15 is a schematic structural diagram of a transmit end according to an embodiment of this application. The transmit end may be, for example, a UE or a gNB. As shown in FIG. 15, the transmit end may include a processor 1501, a memory 1502, a transmitter 1503, and at least one communications bus 1504. The communications bus 1504 is configured to implement a communication connection between elements. The memory 1502 may include a high-speed RAM memory, and may further include a nonvolatile memory (NVM), such as at least one magnetic disk storage. The memory 1502 may store various programs that are used to perform various processing functions and implement the method steps in the embodiments. The transmitter 1503 in this embodiment may be a corresponding output interface that has a communication function and an information transmission function, or a radio frequency module or a baseband module on the transmit end.

In this embodiment, the processor 1501 is configured to: determine whether a to-be-sent complete service data unit (SDU) needs to be segmented; and when the complete SDU does not need to be segmented, add the complete SDU to a Radio Link Control protocol data unit (RLC PDU), where an RLC header of the RLC PDU does not include an SN of the complete SDU.

The transmitter 1503 is configured to send the RLC PDU through a Media Access Control (MAC) layer, where the RLC PDU is transmitted in unacknowledged mode (UM).

The transmit end provided in this embodiment may be configured to execute the technical solution in any method embodiment shown in FIG. 10. Implementation principles and technical effects of the technical solutions are similar to those of the method embodiment, and details are not described herein again.

This application may further provide a transmit end, and the transmit end may be, for example, a UE or a gNB. The transmit end has a structure the same as that of the transmit end shown in FIG. 15. A processor is configured to: determine whether a to-be-sent complete SDU needs to be segmented; and when the complete service data unit (SDU) does not need to be segmented, use the complete SDU as a Radio Link Control protocol data unit (RLC PDU), and instruct a Media Access Control (MAC) layer to add, to a MAC header of a MAC PDU, indication information used to indicate that the RLC PDU does not include an RLC header, where the MAC PDU includes the RLC PDU, and the RLC PDU is transmitted in unacknowledged mode (UM). A transmitter is configured to send the RLC PDU through the MAC layer.

The transmit end provided in this embodiment may be configured to execute the technical solution in any method embodiment shown in FIG. 11. Implementation principles and technical effects of the technical solutions are similar to those of the method embodiment, and details are not described herein again.

This application further provides a readable storage medium, where the readable storage medium stores an instruction. When at least one processor of a receive end executes the instruction, the receive end performs the data transmission method provided in any one of the method embodiments shown in FIG. 1, FIG. 3, FIG. 8, and FIG. 9.

This application further provides a readable storage medium, where the readable storage medium stores an instruction. When at least one processor of a transmit end executes the instruction, the transmit end performs the data transmission method provided in the method embodiment shown in FIG. 10.

This application further provides a readable storage medium, where the readable storage medium stores an instruction. When at least one processor of a transmit end executes the instruction, the transmit end performs the data transmission method provided in the method embodiment shown in FIG. 11.

This application further provides a program product, where the program product includes an instruction, and the instruction is stored in a readable storage medium. At least one processor of a receive end may read the instruction from the readable storage medium, and execute the instruction, so that the receive end implements the data transmission method in any one of the method embodiments shown in FIG. 1, FIG. 3, FIG. 8, and FIG. 9.

This application further provides a program product, where the program product includes an instruction, and the instruction is stored in a readable storage medium. At least one processor of a transmit end may read the instruction from the readable storage medium, and execute the instruction, so that the transmit end implements the data transmission method provided in the method embodiment shown in FIG. 10.

This application further provides a program product, where the program product includes an instruction, and the instruction is stored in a readable storage medium. At least one processor of a transmit end may read the instruction from the readable storage medium, and execute the instruction, so that the transmit end implements the data transmission method provided in the method embodiment shown in FIG. 11.

To reduce transmission overheads, as shown in FIG. 16, this application further provides a data transmission method. The method may be performed by a transmit end, and the transmit end may be, for example, a UE or a gNB. As shown in FIG. 16, the method includes the following steps.

Step 1601: Determine a protocol data unit (PDU) of a protocol layer, where the PDU includes a format indicator field of a PDU of an upper layer of the protocol layer.

The format indicator field is used to indicate whether the PDU of the upper layer includes specific information. The protocol layer may be a Packet Data Convergence Protocol (PDCP) layer or a Radio Link Control (RLC) layer. When the protocol layer is the PDCP, the upper layer of the protocol layer is a Service Data Adaptation Protocol (SDAP) layer. When the protocol layer is the RLC, the upper layer of the protocol layer is the PDCP.

Optionally, when the upper layer of the protocol layer is the SDAP layer, the specific information may be a quality of service flow identifier (QoS flow ID). The QoS flow ID is used to indicate a QoS flow to which an SDAP PDU belongs, so that a UE or a gNB identifies the QoS flow. For example, a value 1 of the format indicator field may represent that the SDAP PDU includes the QoS flow ID; and a value 0 of the format indicator field may represent that the SDAP PDU does not include the QoS flow ID.

Optionally, when the upper layer of the protocol layer is the SDAP layer, the specific information may alternatively be a PDU header. For example, a value 1 of the format indicator field may represent that the SDAP PDU includes the PDU header; and a value 0 of the format indicator field may represent that the SDAP PDU does not include the PDU header.

Optionally, when the upper layer of the protocol layer is the SDAP layer, the format indicator field may be included in a PDU header of the protocol layer.

Optionally, when the upper layer of the protocol layer is the PDCP layer, the specific information may be a sequence number (SN).

Step 1602: Send the PDU of the protocol layer through a lower layer of the protocol layer.

According to the data transmission method provided in this embodiment of this application, because the specific information is not necessarily carried in some transmission scenarios, the PDU of the protocol layer includes the format indicator field used to indicate whether the upper layer of the protocol layer includes the specific information. In addition, a length of specific indication information is usually greater than that of the format indicator field, so that transmission overheads are reduced.

To reduce transmission overheads, as shown in FIG. 17, this application further provides a data transmission method. The method may be performed by a receive end, and the receive end may be, for example, a UE or a gNB. As shown in FIG. 17, the method includes the following steps.

Step 1701: Determine an RLC PDU, where the RLC PDU includes at least one format indicator field.

The format indicator field is used to indicate whether a specified area corresponding to the format indicator field includes a specific indicator field. Each of the at least one format indicator field corresponds to one specified area. The specific indicator field includes a lost packet SN indicator field, and/or a consecutively lost packet SN indicator field, and/or an SOstart field, and/or an SOend field. The lost packet SN indicator field is used to indicate an SN of a lost RLC PDU. The consecutively lost packet SN indicator field is used to indicate a quantity of consecutively lost RLC PDUs. The SOend field is used to indicate a position of a last byte of an SDU segment in a complete SDU. The SOstart field is used to indicate a position of a first byte of an SDU segment in a complete SDU.

After a transmit end sends a group of RLC PDUs to the receive end, when the receive end does not receive one or more of the RLC PDUs, the receive end needs to send, to the transmit end, an RLC PDU used to indicate specific SNs corresponding to SDUs that are not successfully received. In the related art, an RLC PDU sent by a receive end sequentially includes SNs of all SDUs that are not successfully received, and specifically, when an SDU segment of a specific SDU is not successfully received, the RLC PDU needs to further include an SOstart field and an SOend field that correspond to the SDU segment. In this embodiment, the specific indicator field includes the consecutively lost packet SN indicator field, so that a quantity of SNs included in the RLC PDU may be reduced. For example, if ten SDUs whose SNs are SN1 to SN10 are not successfully received, in the prior art, the RLC PDU needs to include SN1, SN2, . . . , and SN10, and in this application, the RLC PDU needs to include only SN1 and a consecutively lost packet SN indicator field having a value of 10. In addition, in some scenarios, only a start SN (for example, SN1) of lost SDUs and the consecutively lost packet SN indicator field does not need to be included. Therefore, in this application, the format indicator field is used to indicate whether the specified area corresponding to the format indicator field includes the consecutively lost packet SN indicator field, so that transmission overheads can be further reduced.

In addition, in the related art, when an SDU segment of a specific SDU is not successfully received, both an SOstart field and an SOend field need to be indicated for the SDU segment. However, in some scenarios, the SOstart field and the SOend field do not need to be indicated at the same time, for example, when the SDU segment is a first segment of a complete SDU or the SDU segment is a last segment of a complete SDU. In this embodiment, the format indicator field is used to indicate whether the specified area corresponding to the format indicator field includes the SOstart field and/or the SOend field, so that transmission overheads can be further reduced.

For example, a value "00" of the format indicator field may represent that the specified area corresponding to the format indicator field does not include the SOstart field and the SOend field. A value "01" of the format indicator field may represent that the specified area corresponding to the format indicator field includes the SOstart field but does not include the SOend field, and when there is the consecutively lost packet SN indicator field, the SOstart field corresponds to a first packet indicated by the consecutively lost packet SN indicator field. A value "10" of the format indicator field may represent that the specified area corresponding to the format indicator field does not include the SOstart field but includes the SOend field, and when there is the consecutively lost packet SN indicator field, the SOend field corresponds to a last packet indicated by the consecutively lost packet SN indicator field. A value "11" of the format indicator field may represent that the specified area corresponding to the format indicator field includes both the SOstart field and the SOend field, and when there is the consecutively lost packet SN indicator field, the SOstart field corresponds to a first packet indicated by the consecutively lost packet SN indicator field, and the SOend field corresponds to a last packet indicated by the consecutively lost packet SN indicator field. It should be noted that a binding relationship between a value of the indicator field and indicated content is not limited, provided that different values of the indicator field indicate different meanings.

Step 1702: Send the RLC PDU through a lower layer of the protocol layer.

According to the data transmission method provided in this embodiment of this application, the RLC PDU includes the format indicator field, and the format indicator field indicates whether the specified area corresponding to the format indicator field includes the specific indicator field, thereby avoiding transmission overheads brought by carrying a specific indicator field when the specific indicator field does not need to be carried, and reducing transmission overheads.

This application may further provide a data transmission apparatus. The apparatus may be implemented as a part or all of a transmit end by using software, hardware, or a combination thereof. The apparatus has a structure the same as that of the apparatus shown in FIG. 13, and may also include a processing module and a sending module. The processing module is configured to determine a protocol data unit (PDU) of a protocol layer, where the PDU includes a format indicator field of a PDU of an upper layer of the protocol layer, and the format indicator field is used to indicate whether the PDU of the upper layer includes specific information. The sending module is configured to send the PDU of the protocol layer through a lower layer of the protocol layer.

Optionally, the protocol layer is a Packet Data Convergence Protocol (PDCP) layer or a Radio Link Control (RLC) layer.

Optionally, when the protocol layer is the PDCP, the upper layer of the protocol layer is a Service Data Adaptation Protocol (SDAP) layer.

Optionally, when the protocol layer is the RLC, the upper layer of the protocol layer is a PDCP.

Optionally, when the upper layer of the protocol layer is the SDAP layer, the specific information is a quality of service flow identifier (QoS flow ID).

Optionally, when the upper layer of the protocol layer is the SDAP layer, the specific information is a PDU header.

Optionally, when the upper layer of the protocol layer is the SDAP layer, the format indicator field may be included in a PDU header of the protocol layer.

Optionally, when the upper layer of the protocol layer is the PDCP layer, the specific information is a sequence number (SN).

The data transmission apparatus provided in this embodiment may be configured to execute the technical solutions in the method embodiment shown in FIG. 16. Implementation principles and technical effects of the technical solutions are similar to those of the method embodiment, and details are not described herein again.

This application may further provide a data transmission apparatus. The apparatus may be implemented as a part or all of a receive end by using software, hardware, or a combination thereof. The apparatus has a structure the same as that of the apparatus shown in FIG. 13, and may also include a processing module and a sending module. The processing module is configured to determine an RLC PDU, where the RLC PDU includes at least one format indicator field, the format indicator field is used to indicate whether a specified area corresponding to the format indicator field includes a specific indicator field, and each of the at least one format indicator field corresponds to one specified area.

The sending module is configured to send the RLC PDU through a lower layer of present protocol layer.

Optionally, the specific indicator field includes a consecutively lost packet SN indicator field, and/or an SOstart field, and/or an SOend field.

The data transmission apparatus provided in this embodiment may be configured to execute the technical solutions in the method embodiment shown in FIG. 17. Implementation principles and technical effects of the technical solutions are similar to those of the method embodiment, and details are not described herein again.

This application may further provide a transmit end, and the transmit end may be, for example, a UE or a gNB. The transmit end in this embodiment has a structure the same as that of the transmit end shown in FIG. 15, and may also include a processor, a memory, a transmitter, and at least one communications bus. The processor is configured to determine a protocol data unit (PDU) of a protocol layer, where the PDU includes a format indicator field of a PDU of an upper layer of the protocol layer, and the format indicator field is used to indicate whether the PDU of the upper layer includes specific information. The transmitter is configured to send the PDU of the protocol layer through a lower layer of the protocol layer.

Optionally, the protocol layer is a Packet Data Convergence Protocol (PDCP) layer or a Radio Link Control (RLC) layer.

Optionally, when the protocol layer is the PDCP, the upper layer of the protocol layer is a Service Data Adaptation Protocol (SDAP) layer.

Optionally, when the protocol layer is the RLC, the upper layer of the protocol layer is the PDCP.

Optionally, when the upper layer of the protocol layer is the SDAP layer, the specific information is a quality of service flow identifier (QoS flow ID).

Optionally, when the upper layer of the protocol layer is the SDAP layer, the specific information is a PDU header.

Optionally, when the upper layer of the protocol layer is the SDAP layer, the format indicator field may be included in a PDU header of the protocol layer.

Optionally, when the upper layer of the protocol layer is the PDCP layer, the specific information is a sequence number (SN).

The transmit end provided in this embodiment may be configured to execute the technical solutions in the method embodiment shown in FIG. 16. Implementation principles and technical effects of the technical solutions are similar to those of the method embodiment, and details are not described herein again.

This application may further provide a receive end, and the receive end may be, for example, a UE or a gNB. The receive end in this embodiment has a structure the same as that of the transmit end shown in FIG. 15, and may also include a processor, a memory, a transmitter, and at least one communications bus. The processor is configured to determine an RLC PDU, where the RLC PDU includes at least one format indicator field, the format indicator field is used to indicate whether a specified area corresponding to the format indicator field includes a specific indicator field, and each of the at least one format indicator field corresponds to one specified area. The transmitter is configured to send the RLC PDU through a lower layer of the protocol layer.

Optionally, the specific indicator field includes a consecutively lost packet SN indicator field, and/or an SOstart field, and/or an SOend field.

The receive end provided in this embodiment may be configured to execute the technical solutions in the method embodiment shown in FIG. 17. Implementation principles and technical effects of the technical solutions are similar to those of the method embodiment, and details are not described herein again.

This application further provides a readable storage medium, where the readable storage medium stores an executable instruction. When at least one processor of a receive end executes the executable instruction, a transmit end performs the data transmission method provided in the method embodiment shown in FIG. 16.

This application further provides a readable storage medium, where the readable storage medium stores an executable instruction. When at least one processor of a transmit end executes the executable instruction, a receive end performs the data transmission method in the method embodiment shown in FIG. 17.

This application further provides a program product, where the program product includes an executable instruction, and the executable instruction is stored in a readable storage medium. At least one processor of a receive end may read the executable instruction from the readable storage medium, and the at least one processor executes the executable instruction, so that a transmit end implements the data transmission method provided in the method embodiment shown in FIG. 16.

This application further provides a program product, where the program product includes an executable instruction, and the executable instruction is stored in a readable storage medium. At least one processor of a transmit end may read the executable instruction from the readable storage medium, and the at least one processor executes the executable instruction, so that a receive end implements the data transmission method provided in the method embodiment shown in FIG. 17.

For the transmit end and the receive end in the embodiments, refer to a device shown in FIG. 18. As an example, the device may implement a function similar to that of the processor in FIG. 14. In FIG. 18, the device includes a processor 1801, a data sending processor 1802, and a data receiving processor 1803. In FIG. 18, the foregoing processing module may be the processor 1801, and implements a corresponding function. The foregoing sending module may be the data sending processor 1802 in FIG. 18, and the foregoing receiving module may be the data receiving processor 1803 in FIG. 18. Although a channel encoder and a channel decoder are shown in the figure, it may be understood that these modules are not construed as a limitation to this embodiment, and are merely an example.

FIG. 19 shows another form of this embodiment. A processing apparatus 1900 includes modules such as a modulation subsystem, a central processing subsystem, and a peripheral subsystem. The transmit end and the receive end in the embodiments may be used as modulation subsystems in the processing apparatus 1900. Specifically, the modulation subsystem may include a processor 1901 and an interface 1902. The processor 1901 implements functions of the foregoing processing module, and the interface 1902 implements functions of the foregoing sending module and/or receiving module. As another variant, the modulation subsystem includes a memory 1903, a processor 1901, and a program that is stored in the memory and is capable of running on the processor. When executing the program, the processor implements the methods in the foregoing method embodiments. It should be noted that the memory 1903 may be nonvolatile or volatile, and may be located in the modulation subsystem or in the processing apparatus 1900, provided that the memory 1903 can be connected to the processor 1901.

In the foregoing implementation of the transmit end or the receive end, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. The steps of the methods disclosed with reference to this application may be directly performed and completed by a hardware processor, or may be performed and completed by using a combination of hardware and software modules in the processor.

All or some of the steps of the method embodiments may be implemented by a program instructing related hardware. The program may be stored in a readable memory. When the program runs, the steps of the method embodiments are performed. The foregoing memory (storage medium) includes: a read-only memory (ROM), a RAM, a flash memory, a hard disk, a solid-state drive, a magnetic tape, a floppy disk, an optical disc, or any combination thereof.

What is claimed is:

1. A method, comprising:
receiving, by a receive end, a first Radio Link Control protocol data unit (RLC PDU), wherein the first RLC PDU comprises a first service data unit (SDU) segment, wherein the first SDU segment belongs to a first complete SDU;
determining, by the receive end, that assembly of the first complete SDU fails within a time range specified by a timer;
discarding, by the receive end when the timer expires, the first SDU segment and a second SDU segment, wherein the second SDU segment was received earlier than the first SDU segment;
determining, by the receive end when the timer expires, whether there is an SDU segment of a second complete SDU;
based on determining that there is an SDU segment of the second complete SDU, starting, by the receive end, the timer;
generating, by the receive end, based on one or more of third RLC PDUs from a transmit end not being received by the receive end, a fourth RLC PDU, wherein the fourth RLC PDU comprises at least one format indicator field, wherein a first format indicator field of the at least one format indicator field indicates whether an area corresponding to the first format indicator field comprises a consecutively lost packet sequence number (SN) indicator field, wherein the consecutively lost packet SN indicator field indicates a quantity of consecutively lost RLC SDUs; and
sending, by the receive end to the transmit end, the fourth RLC PDU;
wherein a second format indicator field of the at least one format indicator field indicates whether an area corresponding to the second format indicator field comprises an SOstart field and/or an SOend field, wherein the second format indicator field relates to an SDU segment in a complete SDU, wherein the SOend field indicates a position of a last byte of the SDU segment in the complete SDU, and the SOstart field indicates a position of a first byte of the SDU segment in the complete SDU.

2. The method according to claim 1, wherein an RLC header of the first RLC PDU comprises an SN of the first complete SDU.

3. The method according to claim 1, further comprising:
receiving, by the receive end, a second RLC PDU in unacknowledged mode (UM);
determining, by the receive end, that the second RLC PDU comprises a third complete SDU; and
transmitting, by the receive end, the third complete SDU comprised in the second RLC PDU to a packet data convergence protocol (PDCP) layer.

4. The method according to claim 3, wherein an RLC header of the second RLC PDU does not comprise an SN of an SDU.

5. The method according to claim 3, wherein an RLC header of the second RLC PDU does not comprise an SN for the third complete SDU.

6. The method according to claim 1, further comprising:
receiving, by the receive end, a second RLC PDU;
determining, by the receive end, that the second RLC PDU comprises a third SDU segment belonging to a third complete SDU;
assembling, by the receive end, the third complete SDU; and
transmitting, by the receive end, the assembled third complete SDU to a packet data convergence protocol (PDCP) layer.

7. The method according to claim 1, wherein the first RLC PDU is received in unacknowledged mode (UM).

8. The method according to claim 1, wherein the started timer is set to correspond to a latest received SDU segment of a plurality of SDU segments.

9. The method according to claim 1, wherein a third format indicator field of the at least one format indicator field indicates whether an area corresponding to the third format indicator field comprises a lost packet SN indicator field, wherein the lost packet SN indicator field indicates an SN of a lost RLC SDU.

10. A receive end, comprising:
a transceiver; and
a processor;
wherein the transceiver is configured to receive a first Radio Link Control protocol data unit (RLC PDU), wherein the first RLC PDU comprises a first service data unit (SDU) segment, wherein the first SDU segment belongs to a first complete SDU; and
wherein the processor is configured to:
determine that assembly of the first complete SDU fails within a time range specified by a timer;
discard, when the timer expires, the first SDU segment and a second SDU segment, wherein the second SDU segment was received earlier than the first SDU segment;
determine, when the timer expires, whether there is an SDU segment of a second complete SDU;
based on determining that there is an SDU segment of the second complete SDU, start the timer; and
generate, based on one or more of third RLC PDUs from a transmit end not being received by the receive end, a fourth RLC PDU, wherein the fourth RLC PDU comprises at least one format indicator field, wherein a first format indicator field of the at least one format indicator field indicates whether an area corresponding to the first format indicator field comprises a consecutively lost packet sequence number (SN) indicator field, wherein the consecutively lost packet SN indicator field indicates a quantity of consecutively lost RLC SDUs; and
wherein the transceiver is further configured to send, to the transmit end, the fourth RLC PDU;
wherein a second format indicator field of the at least one format indicator field indicates whether an area corresponding to the second format indicator field comprises an SOstart field and/or an SOend field, wherein the second format indicator field relates to an SDU segment in a complete SDU, wherein the SOend field indicates a position of a last byte of the SDU segment in the complete SDU, and the SOstart field indicates a position of a first byte of the SDU segment in the complete SDU.

11. The receive end according to claim 10, wherein an RLC header of the first RLC PDU comprises an SN of the first complete SDU.

12. The receive end according to claim 10, wherein the transceiver is further configured to receive a second RLC PDU in unacknowledged mode (UM);
wherein the processor is further configured to determine that the second RLC PDU comprises a third complete SDU; and
wherein the transceiver is further configured to transmit the third complete SDU comprised in the second RLC PDU to a packet data convergence protocol (PDCP) layer.

13. The receive end according to claim 12, wherein an RLC header of the second RLC PDU does not comprise an SN of an SDU.

14. The receive end according to claim 10, wherein the transceiver is further configured to receive a second RLC PDU;
wherein the processor is further configured to determine that the second RLC PDU comprises a third SDU segment belonging to a third complete SDU and assemble the third complete SDU; and
wherein the transceiver is further configured to transmit the assembled third complete SDU to a packet data convergence protocol (PDCP) layer.

15. The receive end according to claim 10, wherein the first RLC PDU is received in unacknowledged mode (UM).

16. The receive end according to claim 10, wherein a third format indicator field of the at least one format indicator field indicates whether an area corresponding to the third format indicator field comprises a lost packet SN indicator field, wherein the lost packet SN indicator field indicates an SN of a lost RLC SDU.

17. An apparatus, comprising a processor and a non-transitory memory having processor-executable instructions stored thereon, wherein the processor-executable instructions, when executed by the processor, facilitate:
receiving, by the apparatus, a first Radio Link Control protocol data unit (RLC PDU), wherein the first RLC PDU comprises a first service data unit (SDU) segment, wherein the first SDU segment belongs to a first complete SDU;
determining, by the apparatus, that assembly of the first complete SDU fails within a time range specified by a timer;
discarding, by the apparatus when the timer expires, the first SDU segment and a second SDU segment, wherein the second SDU segment was received earlier than the first SDU segment;

determining, by the apparatus when the timer expires, whether there is an SDU segment of a second complete SDU;

based on determining that there is an SDU segment of the second complete SDU, starting, by the apparatus, the timer;

generating, by the apparatus, based on one or more of third RLC PDUs from a transmit end not being received by the apparatus, a fourth RLC PDU, wherein the fourth RLC PDU comprises at least one format indicator field, wherein a first format indicator field of the at least one format indicator field indicates whether an area corresponding to the first format indicator field comprises a consecutively lost packet sequence number (SN) indicator field, wherein the consecutively lost packet SN indicator field indicates a quantity of consecutively lost RLC SDUs; and sending, by the apparatus to the transmit end, the fourth RLC PDU;

wherein a second format indicator field of the at least one format indicator field indicates whether an area corresponding to the second format indicator field comprises an SOstart field and/or an SOend field, wherein the second format indicator field relates to an SDU segment in a complete SDU, wherein the SOend field indicates a position of a last byte of the SDU segment in the complete SDU, and the SOstart field indicates a position of a first byte of the SDU segment in the complete SDU.

18. The apparatus according to claim 17, wherein an RLC header of the first RLC PDU comprises an SN of the first complete SDU.

19. The apparatus according to claim 17, wherein the processor-executable instructions, when executed by the processor, further facilitate:

receiving, by the apparatus, a second RLC PDU in unacknowledged mode (UM);

determining, by the apparatus, that the second RLC PDU comprises a third complete SDU; and transmitting, by the apparatus, the third complete SDU comprised in the second RLC PDU to a packet data convergence protocol (PDCP) layer.

20. The apparatus according to claim 19, wherein an RLC header of the second RLC PDU does not comprise an SN for the third complete SDU.

21. The apparatus according to claim 17, wherein processor-executable instructions, when executed by the processor, further facilitate:

receiving, by the apparatus, a second RLC PDU;

determining, by the apparatus, that the second RLC PDU comprises a third SDU segment belonging to a third complete SDU;

assembling, by the apparatus, the third complete SDU; and transmitting, by the apparatus, the assembled third complete SDU to a packet data convergence protocol (PDCP) layer.

22. The apparatus according to claim 17, wherein the started timer is set to correspond to a latest received SDU segment of a plurality of SDU segments.

23. The apparatus according to claim 17, wherein a third format indicator field of the at least one format indicator field indicates whether an area corresponding to the third format indicator field comprises a lost packet SN indicator field, wherein the lost packet SN indicator field indicates an SN of a lost RLC SDU.

24. A non-transitory computer readable storage medium having processor-executable instructions stored thereon, wherein the processor-executable instructions, when executed, facilitate:

receiving a first Radio Link Control protocol data unit (RLC PDU), wherein the first RLC PDU comprises a first service data unit (SDU) segment, wherein the first SDU segment belongs to a first complete SDU;

determining that assembly of the first complete SDU fails within a time range specified by a timer;

discarding, when the timer expires, the first SDU segment and a second SDU segment, wherein the second SDU segment was received earlier than the first SDU segment;

determining, when the timer expires, whether there is an SDU segment of a second complete SDU;

based on determining that there is an SDU segment of the second complete SDU, starting the timer;

generating, based on one or more of third RLC PDUs from a transmit end not being received, a fourth RLC PDU, wherein the fourth RLC PDU comprises at least one format indicator field, wherein a first format indicator field of the at least one format indicator field indicates whether an area corresponding to the first format indicator field comprises a consecutively lost packet sequence number (SN) indicator field, wherein the consecutively lost packet SN indicator field indicates a quantity of consecutively lost RLC SDUs; and sending, to the transmit end, the fourth RLC PDU;

wherein a second format indicator field of the at least one format indicator field indicates whether an area corresponding to the second format indicator field comprises an SOstart field and/or an SOend field, wherein the second format indicator field relates to an SDU segment in a complete SDU, wherein the SOend field indicates a position of a last byte of the SDU segment in the complete SDU, and the SOstart field indicates a position of a first byte of the SDU segment in the complete SDU.

25. The non-transitory computer readable storage medium according to claim 24, wherein an RLC header of a second RLC PDU does not comprise an SN for a third complete SDU comprised in the second RLC PDU.

26. The non-transitory computer readable storage medium according to claim 24, wherein the started timer is set to correspond to a latest received SDU segment of a plurality of SDU segments.

27. The non-transitory computer readable storage medium according to claim 24, wherein a third format indicator field of the at least one format indicator field indicates whether an area corresponding to the third format indicator field comprises a lost packet SN indicator field, wherein the lost packet SN indicator field indicates an SN of a lost RLC SDU.

* * * * *